US007505921B1

(12) United States Patent
Lukas et al.

(10) Patent No.: US 7,505,921 B1
(45) Date of Patent: Mar. 17, 2009

(54) SYSTEM AND METHOD FOR OPTIMIZING A PRODUCT CONFIGURATION

(75) Inventors: Andrew V. Lukas, Boulder, CO (US);
George Lukas, Brighton, MA (US);
David L. Klencke, Boulder, CO (US);
Clifford Nass, Stanford, CA (US)

(73) Assignee: Finali Corporation, Westminster, CO (US)

( * ) Notice: Subject to any disclaimer, the term of this patent is extended or adjusted under 35 U.S.C. 154(b) by 0 days.

(21) Appl. No.: 09/518,916

(22) Filed: Mar. 3, 2000

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| 3,829,088 | A | 8/1974 | Pahlas |
| 4,451,985 | A | 6/1984 | Pullman |
| D276,626 | S | 12/1984 | Lockwood |
| 4,567,359 | A | 1/1986 | Lockwood |
| RE32,115 | E | 4/1986 | Lockwood et al. |
| D286,956 | S | 12/1986 | Lockwood |
| 4,793,810 | A | 12/1988 | Beasley, Jr. |
| 4,949,278 | A | 8/1990 | Davies et al. |
| 4,992,940 | A | 2/1991 | Dworkin |
| 4,999,833 | A | 3/1991 | Lee |
| 5,002,491 | A | 3/1991 | Abrahamson et al. |
| 5,059,127 | A | 10/1991 | Lewis et al. |
| 5,175,800 | A | 12/1992 | Galis et al. |
| 5,204,813 | A | 4/1993 | Samph et al. |
| 5,206,903 | A | 4/1993 | Kohler et al. |
| 5,208,869 | A | 5/1993 | Holt |
| 5,211,563 | A | 5/1993 | Haga et al. |
| 5,214,715 | A | 5/1993 | Carpenter et al. |

(Continued)

FOREIGN PATENT DOCUMENTS

CA  2 301 664  7/1998

(Continued)

OTHER PUBLICATIONS

Dell Uses Internet to Offer Small Business Customers Personalized Sales and Educational Programs, Business Editors & Technology Writers. Business Wire, New York: Jul. 20, 1998, downloaded from ProQuest on the Internet on Oct. 14, 2004, 2 pages.*

(Continued)

*Primary Examiner*—James Zurita
(74) *Attorney, Agent, or Firm*—Frost Brown Todd LLC; William S Moriss

(57) ABSTRACT

A method of optimizing a product includes the step of accessing an event record having a summary of a sequence of events that transpired during a preliminary product selection process. The summary includes an identification of the user and a preliminary designation of the product. A user profile associated with the user includes at least one characteristic corresponding to the user. Based on characteristics in the user profile, a formatted display is generated. User response to formatted displays is used to update characteristics in the user profile. An iterative process, in which the updated user profile is used as a basis for generating subsequent formatted displays to which a user responds, repeats until the user indicates that the product is optimized.

39 Claims, 13 Drawing Sheets

U.S. PATENT DOCUMENTS

| | | |
|---|---|---|
| 5,251,268 A | 10/1993 | Colley et al. |
| 5,261,823 A | 11/1993 | Kurokawa |
| 5,267,865 A | 12/1993 | Lee et al. |
| 5,294,229 A | 3/1994 | Hartzell et al. |
| 5,302,132 A | 4/1994 | Corder |
| 5,309,355 A | 5/1994 | Lockwood |
| 5,310,349 A | 5/1994 | Daniels et al. |
| 5,337,141 A | 8/1994 | Egli et al. |
| 5,345,380 A | 9/1994 | Babson, III et al. |
| 5,397,865 A | 3/1995 | Park |
| 5,411,947 A | 5/1995 | Hostetler et al. |
| 5,412,576 A | 5/1995 | Hansen |
| 5,434,994 A | 7/1995 | Shaheen et al. |
| 5,441,415 A | 8/1995 | Lee et al. |
| 5,444,774 A | 8/1995 | Friedes |
| 5,458,494 A | 10/1995 | Krohn et al. |
| 5,493,490 A | 2/1996 | Johnson |
| 5,513,991 A | 5/1996 | Reynolds et al. |
| 5,513,994 A | 5/1996 | Kershaw et al. |
| 5,546,539 A | 8/1996 | Poling |
| 5,576,951 A | 11/1996 | Lockwood |
| 5,581,664 A | 12/1996 | Allen et al. |
| 5,586,218 A | 12/1996 | Allen |
| 5,594,791 A | 1/1997 | Szlam et al. |
| 5,615,296 A | 3/1997 | Stanford et al. |
| 5,625,748 A | 4/1997 | McDonough et al. |
| 5,630,025 A | 5/1997 | Dolby et al. |
| 5,636,036 A | 6/1997 | Ashbey |
| 5,652,897 A | 7/1997 | Linebarger et al. |
| 5,678,002 A | 10/1997 | Fawcett et al. |
| 5,701,399 A | 12/1997 | Lee et al. |
| 5,701,419 A | 12/1997 | McConnell |
| 5,708,798 A | 1/1998 | Lynch et al. |
| 5,710,887 A | 1/1998 | Chelliah et al. |
| 5,721,845 A | 2/1998 | James et al. |
| 5,727,950 A | 3/1998 | Cook et al. |
| 5,743,746 A | 4/1998 | Ho et al. |
| 5,745,765 A | 4/1998 | Paseman |
| 5,748,711 A | 5/1998 | Scherer |
| 5,757,904 A | 5/1998 | Anderson |
| 5,758,257 A | 5/1998 | Herz et al. |
| 5,781,914 A | 7/1998 | Stork et al. |
| 5,784,539 A | 7/1998 | Lenz |
| 5,788,504 A | 8/1998 | Rice et al. |
| 5,788,508 A | 8/1998 | Lee et al. |
| 5,802,526 A | 9/1998 | Fawcett et al. |
| 5,802,536 A | 9/1998 | Yoshii et al. |
| 5,809,282 A | 9/1998 | Cooper et al. |
| 5,812,743 A | 9/1998 | Takahashi |
| 5,822,743 A | 10/1998 | Gupta et al. |
| 5,825,651 A | 10/1998 | Gupta et al. |
| 5,825,869 A | 10/1998 | Brooks et al. |
| 5,827,070 A | 10/1998 | Kershaw et al. |
| 5,844,554 A | 12/1998 | Geller et al. |
| 5,852,814 A | 12/1998 | Allen |
| 5,867,562 A | 2/1999 | Scherer |
| 5,872,833 A | 2/1999 | Scherer |
| 5,877,966 A | 3/1999 | Morris et al. |
| 5,895,466 A | 4/1999 | Goldberg et al. |
| 5,904,485 A | 5/1999 | Siefert |
| 5,907,706 A | 5/1999 | Brodsky et al. |
| 5,909,589 A | 6/1999 | Parker et al. |
| 5,918,217 A | 6/1999 | Maggioncalda et al. |
| 5,920,848 A | 7/1999 | Schutzer et al. |
| 5,944,839 A | 8/1999 | Isenberg |
| 5,947,747 A | 9/1999 | Walker et al. |
| 5,951,694 A | 9/1999 | Choquier et al. |
| 5,956,683 A | 9/1999 | Jacobs et al. |
| 5,956,709 A | 9/1999 | Xue |
| 5,960,399 A | 9/1999 | Barclay et al. |
| 5,963,939 A | 10/1999 | McCann et al. |
| 5,963,940 A | 10/1999 | Liddy et al. |
| 5,963,953 A | 10/1999 | Cram et al. |
| 5,966,429 A | 10/1999 | Scherer |
| 5,970,482 A | 10/1999 | Pham et al. |
| 5,974,446 A | 10/1999 | Sonnenreich et al. |
| 5,978,648 A | 11/1999 | George et al. |
| 5,983,220 A | 11/1999 | Schmitt |
| 5,987,376 A | 11/1999 | Olson et al. |
| 5,987,415 A | 11/1999 | Breese et al. |
| 5,991,394 A | 11/1999 | Dezonno et al. |
| 6,002,854 A | 12/1999 | Lynch et al. |
| 6,012,051 A | 1/2000 | Sammon, Jr. et al. |
| 6,018,722 A | 1/2000 | Ray et al. |
| 6,021,403 A | 2/2000 | Horvitz et al. |
| 6,029,099 A | 2/2000 | Brown |
| 6,032,129 A | 2/2000 | Greef et al. |
| 6,035,283 A | 3/2000 | Rofrano |
| 6,038,544 A | 3/2000 | Machin et al. |
| 6,044,142 A | 3/2000 | Hammarstrom et al. |
| 6,044,146 A | 3/2000 | Gisby et al. |
| 6,055,569 A | 4/2000 | O'Brien et al. |
| 6,067,525 A | 5/2000 | Johnson et al. |
| 6,070,142 A | 5/2000 | McDonough et al. |
| 6,070,149 A | 5/2000 | Tavor et al. |
| 6,088,722 A | 7/2000 | Herz et al. |
| 6,091,930 A | 7/2000 | Mortimer et al. |
| 6,094,673 A | 7/2000 | Dilip et al. |
| 6,105,003 A | 8/2000 | Morohashi et al. |
| 6,112,186 A | 8/2000 | Bergh et al. |
| 6,117,187 A | 9/2000 | Staelin |
| 6,119,101 A | 9/2000 | Peckover |
| 6,122,632 A | 9/2000 | Botts et al. |
| 6,125,356 A | 9/2000 | Brockman et al. |
| 6,137,870 A | 10/2000 | Scherer |
| 6,138,105 A | 10/2000 | Walker et al. |
| 6,145,002 A | 11/2000 | Srinivasan |
| 6,167,383 A * | 12/2000 | Henson ..................... 705/26 |
| 6,169,979 B1 | 1/2001 | Johnson |
| 6,173,266 B1 | 1/2001 | Marx et al. |
| 6,173,279 B1 | 1/2001 | Levin et al. |
| 6,177,932 B1 | 1/2001 | Galdes et al. |
| 6,178,546 B1 | 1/2001 | McIntyre |
| 6,182,059 B1 | 1/2001 | Angotti et al. |
| 6,188,751 B1 | 2/2001 | Scherer |
| 6,192,110 B1 | 2/2001 | Abella et al. |
| 6,201,948 B1 | 3/2001 | Cook et al. |
| 6,205,207 B1 | 3/2001 | Scherer |
| 6,212,502 B1 | 4/2001 | Ball et al. |
| 6,219,654 B1 | 4/2001 | Ruffin |
| 6,220,743 B1 | 4/2001 | Campestre et al. |
| 6,223,609 B1 | 5/2001 | Leifeld et al. |
| 6,233,547 B1 | 5/2001 | Denber |
| 6,233,570 B1 | 5/2001 | Horvitz et al. |
| 6,236,978 B1 | 5/2001 | Tuzhilin |
| 6,237,035 B1 | 5/2001 | Himmel et al. |
| 6,243,680 B1 | 6/2001 | Gupta et al. |
| 6,243,684 B1 | 6/2001 | Stuart et al. |
| 6,243,754 B1 | 6/2001 | Guerin et al. |
| 6,247,005 B1 | 6/2001 | Edwards et al. |
| 6,249,807 B1 | 6/2001 | Shaw et al. |
| 6,249,809 B1 | 6/2001 | Bro |
| 6,253,173 B1 | 6/2001 | Ma |
| 6,256,620 B1 | 7/2001 | Jawahar et al. |
| 6,260,035 B1 | 7/2001 | Horvitz et al. |
| 6,262,730 B1 | 7/2001 | Horvitz et al. |
| 6,263,066 B1 | 7/2001 | Shtivelman et al. |
| 6,263,325 B1 | 7/2001 | Yoshida et al. |
| 6,266,649 B1 | 7/2001 | Linden et al. |
| 6,275,806 B1 | 8/2001 | Pertrushin |
| 6,278,996 B1 | 8/2001 | Richardson et al. |
| 6,282,527 B1 | 8/2001 | Gounares et al. |
| 6,282,565 B1 | 8/2001 | Shaw et al. |
| 6,285,986 B1 | 9/2001 | Andrews |

| | | | | | | |
|---|---|---|---|---|---|---|
| 6,304,864 | B1 | 10/2001 | Liddy et al. | 6,775,378 B1 | 8/2004 | Villena et al. |
| 6,317,722 | B1 | 11/2001 | Jocobi et al. | 6,798,876 B1 | 9/2004 | Bala |
| 6,321,209 | B1 | 11/2001 | Pasquali | 6,819,759 B1 | 11/2004 | Khue et al. |
| 6,330,554 | B1 | 12/2001 | Altschuler et al. | 6,826,549 B1 | 11/2004 | Marks et al. |
| 6,332,129 | B1 | 12/2001 | Walker et al. | 6,829,603 B1 | 12/2004 | Chai et al. |
| 6,337,906 | B1 | 1/2002 | Bugash et al. | 6,895,558 B1 | 5/2005 | Loveland |
| 6,341,276 | B1 | 1/2002 | Bender et al. | 6,901,397 B1 | 5/2005 | Moldenhauer et al. |
| 6,343,116 | B1 | 1/2002 | Quinton et al. | 6,922,689 B2 | 7/2005 | Shtivelman |
| 6,343,329 | B1 | 1/2002 | Landgraf et al. | 6,934,381 B1 | 8/2005 | Klein et al. |
| 6,356,284 | B1 | 3/2002 | Manduley et al. | 6,941,304 B2 | 9/2005 | Gainey et al. |
| 6,356,633 | B1 | 3/2002 | Armstrong | 6,965,865 B2 | 11/2005 | Pletz et al. |
| 6,356,869 | B1 | 3/2002 | Chapados et al. | 6,999,990 B1 | 2/2006 | Sullivan et al. |
| 6,356,884 | B1 | 3/2002 | Thaler | 7,050,977 B1 | 5/2006 | Bennett |
| 6,370,526 | B1 | 4/2002 | Agrawal et al. | 7,065,188 B1 | 6/2006 | Mei et al. |
| 6,377,944 | B1 | 4/2002 | Busey et al. | 7,068,774 B1 | 6/2006 | Judkins et al. |
| 6,381,640 | B1 | 4/2002 | Beck et al. | 7,092,509 B1 | 8/2006 | Mears et al. |
| 6,389,124 | B1 | 5/2002 | Schnarel et al. | 2001/0014868 A1 | 8/2001 | Herz et al. |
| 6,393,428 | B1 | 5/2002 | Miller et al. | 2001/0032140 A1 | 10/2001 | Hoffman |
| 6,397,193 | B1 | 5/2002 | Walker et al. | 2001/0044743 A1 | 11/2001 | McKinley et al. |
| 6,401,061 | B1 | 6/2002 | Zieman | 2001/0044751 A1 | 11/2001 | Pugliese, III et al. |
| 6,411,926 | B1 | 6/2002 | Chang | 2001/0044759 A1 | 11/2001 | Kutsumi et al. |
| 6,411,947 | B1 | 6/2002 | Rice et al. | 2001/0049632 A1 | 12/2001 | Rigole |
| 6,427,063 | B1 | 7/2002 | Cook et al. | 2001/0051893 A1 | 12/2001 | Hanai et al. |
| 6,434,230 | B1 | 8/2002 | Gabriel | 2001/0054064 A1 | 12/2001 | Kannan |
| 6,442,438 | B1 | 8/2002 | Naillon | 2002/0002502 A1 | 1/2002 | Maes et al. |
| 6,442,493 | B1 | 8/2002 | Jurisch et al. | 2002/0004764 A1 | 1/2002 | Stolze et al. |
| 6,442,519 | B1 | 8/2002 | Kanevsky et al. | 2002/0010645 A1 | 1/2002 | Hagen et al. |
| 6,449,356 | B1 | 9/2002 | Dezonna | 2002/0036658 A1 | 3/2002 | Carolan et al. |
| 6,449,588 | B1 | 9/2002 | Bowman-Amuah | 2002/0055890 A1 | 5/2002 | Foley |
| 6,449,646 | B1 | 9/2002 | Sikora et al. | 2002/0055906 A1 | 5/2002 | Katz et al. |
| 6,451,187 | B1 | 9/2002 | Suzuki et al. | 2002/0107824 A1 | 8/2002 | Ahmed |
| 6,460,037 | B1 | 10/2002 | Weiss et al. | | | |
| 6,473,791 | B1 | 10/2002 | Al-Ghosein et al. | FOREIGN PATENT DOCUMENTS | | |
| 6,473,794 | B1 | 10/2002 | Guheen et al. | CA | 2 248 897 | 10/2001 |
| 6,477,520 | B1 | 11/2002 | Malaviya et al. | CA | 2 485 238 | 12/2004 |
| 6,480,599 | B1 | 11/2002 | Ainslie et al. | EP | 0 077 175 | 4/1983 |
| 6,493,686 | B1 | 12/2002 | Francone et al. | EP | 0 496 492 A1 | 1/1992 |
| 6,498,921 | B1 | 12/2002 | Ho et al. | EP | 0 496 492 B1 | 1/1992 |
| 6,519,571 | B1 | 2/2003 | Guheen et al. | EP | 0 829 996 A2 | 3/1998 |
| 6,519,628 | B1 | 2/2003 | Locascio | EP | 0 700 563 | 9/1998 |
| 6,526,387 | B1 | 2/2003 | Ruffin et al. | EP | 1 191 772 | 3/2002 |
| 6,529,954 | B1 | 3/2003 | Cookmeyer, II et al. | EP | 1 324 534 | 7/2003 |
| 6,553,346 | B1 | 3/2003 | Yu | EP | 1 424 844 | 6/2004 |
| 6,560,590 | B1 | 5/2003 | Shwe et al. | EP | 1 494 499 | 1/2005 |
| 6,563,921 | B1 | 5/2003 | Williams et al. | EP | 0 977 175 | 11/2005 |
| 6,571,225 | B1 | 5/2003 | Oles et al. | GB | 2 343 772 | 7/1997 |
| 6,574,599 | B1 | 6/2003 | Lim et al. | JP | 10133847 | 5/1998 |
| 6,578,054 | B1 | 6/2003 | Hopmann et al. | JP | 2002/055695 | 2/2002 |
| 6,581,048 | B1 | 6/2003 | Werbos | JP | 2002/189483 | 7/2002 |
| 6,584,185 | B1 | 6/2003 | Nixon | JP | 2002/366552 | 12/2002 |
| 6,584,312 | B1 | 6/2003 | Morin et al. | JP | 2002/374356 | 12/2002 |
| 6,598,039 | B1 | 7/2003 | Livowsky | JP | 2004/030503 | 1/2004 |
| 6,600,749 | B1 | 7/2003 | Hayball et al. | JP | 2004/104353 | 4/2004 |
| 6,604,141 | B1 | 8/2003 | Ventura | JP | 2004/118457 | 4/2004 |
| 6,606,598 | B1 | 8/2003 | Holthouse et al. | JP | 2004/220219 | 8/2004 |
| 6,614,885 | B2 | 9/2003 | Polcyn | JP | 2004/241963 | 8/2004 |
| 6,615,172 | B1 | 9/2003 | Bennett et al. | JP | 2004/304278 | 10/2004 |
| 6,633,846 | B1 | 10/2003 | Bennett et al. | JP | 2005/258825 | 9/2005 |
| 6,650,748 | B1 | 11/2003 | Edwards et al. | WO | WO 92/15951 | 9/1992 |
| 6,652,283 | B1 | 11/2003 | Van Schaack et al. | WO | WO 93/21587 | 10/1993 |
| 6,658,396 | B1 | 12/2003 | Tang et al. | WO | WO 95/02221 | 1/1995 |
| 6,658,598 | B1 | 12/2003 | Sullivan | WO | WO 95/27360 | 10/1995 |
| 6,665,395 | B1 | 12/2003 | Busey et al. | WO | WO97/44767 | 11/1997 |
| 6,665,640 | B1 | 12/2003 | Bennett et al. | WO | WO 97/44767 | 11/1997 |
| 6,665,644 | B1 | 12/2003 | Kanevsky et al. | WO | WO 98/32107 | 7/1998 |
| 6,694,314 | B1 | 2/2004 | Sullivan et al. | WO | WO98/32107 | 7/1998 |
| 6,694,482 | B1 | 2/2004 | Arellano et al. | WO | WO 99/01826 | 1/1999 |
| 6,724,887 | B1 | 4/2004 | Eilbacher et al. | WO | WO 99/04347 | 1/1999 |
| 6,732,188 | B1 | 5/2004 | Flockhart et al. | WO | WO 99/53676 | 10/1999 |
| 6,741,698 | B1 | 5/2004 | Jensen | WO | WO00/29977 | 5/2000 |
| 6,748,369 | B2 | 6/2004 | Khedkar et al. | WO | WO 00/29977 | 5/2000 |
| 6,760,727 | B1 | 7/2004 | Schroeder et al. | WO | WO 00/70481 | 11/2000 |
| 6,771,765 | B1 | 8/2004 | Crowther et al. | | | |

| | | |
|---|---|---|
| WO | WO 00/73955 | 12/2000 |
| WO | WO 00/75851 | 12/2000 |
| WO | WO 01/04814 | 1/2001 |
| WO | WO 01/33414 | 5/2001 |
| WO | WO 01/35617 | 5/2001 |
| WO | WO 01/37136 | 5/2001 |
| WO | WO 01/39028 | 5/2001 |
| WO | WO 01/39082 | 5/2001 |
| WO | WO 01/39086 | 5/2001 |
| WO | WO 01/82123 | 11/2001 |
| WO | WO 02/09399 | 1/2002 |
| WO | WO 02/19603 | 3/2002 |
| WO | WO 02/27426 | 4/2002 |
| WO | WO 02/061730 | 8/2002 |
| WO | WO 03/069874 | 8/2002 |
| WO | WO 02/073331 | 9/2002 |
| WO | WO 03/009175 | 1/2003 |
| WO | WO 03/021377 | 3/2003 |
| WO | WO 2004/059805 | 7/2004 |
| WO | WO 2004/091184 | 10/2004 |
| WO | WO 2004/107094 | 12/2004 |
| WO | WO 2005/006116 | 1/2005 |
| WO | WO 2005/011240 | 2/2005 |
| WO | WO 2005/013094 | 2/2005 |
| WO | WO 2005/069595 | 7/2005 |
| WO | WO 2006/050503 | 5/2006 |
| WO | WO 2006/062854 | 6/2006 |
| WO | WO 2007/033300 | 3/2007 |

OTHER PUBLICATIONS

Special Dell-ivery, Joseph E Maglitta. Electronic Business. Highlands Ranch: Dec. 1997. vol. 23, Iss. 12; p. 43, downloaded fro ProQuest on the Internet on Oct. 14, 2004. 7 pages.*

Dell stakes success on build-to-order strategy, Jennifer Mateyaschuk. InformationWeek. Manhasset: Sep. 21, 1998, p. 134 (3 pages), downloaded from ProQuest Direct on the Internet, Jun. 1, 2005.*

Object Design's ObjectStore Selected to Meet Dell EMEA's Next-Generation Web Content-Management Challenge, PR Newsire, New York: Sep. 8, 1998. p. 1, 2 pages, downloaded from ProQuest Direct on the Internet, Jun. 1, 2005.*

More support for IT's needs likely in next edition of pages, Goldberg, Aaron. PC Week. Aug. 31, 1998. vol. 15, Iss. 35; p. 55 (1 page), downloaded from ProQuest Direct on the Internet, Jun. 1, 2005.*

DELL: Dell and the Internet go from strength to strength, M2 Presswire. Conventry: Jul. 7, 1998. p. 1, 2 pages, downloaded from ProQuest Direct on the Internet, Jun. 1, 2005.*

Future Trend: Getting Personal With Customers, John Evan Frook. InternetWeek. Manhasset: Jun. 22, 1998. p. PG.11, 3 pages, downloaded from ProQuest Direct on the Internet, Jun. 1, 2005.*

Dell Relaunches E-commerce Site With New Features; Redesign Significantly Improves the Customer Experience, Business Editors/ Computer Writers. Business Wire. New York: May 21, 1998. p. 1, 3 pages, downloaded from ProQuest Direct on the Internet, Jun. 1, 20.*

It's no secret, Melinda Berger. Sales and Marketing Management. New York: May 1998. vol. 150, Iss. 5; p. 93 (2 page), downloaded from ProQuest Direct on the Internet, Jun. 1, 2005.*

Administaff Announces Preferred Purchasing Agreement With Dell, PR Newswire. New York: Apr. 16, 1998. p. 1, 2 pages, downloaded from ProQuest Direct on the Internet, Jun. 1, 2005.*

The InternetWeek Interview—Michael Dell, chairman and CEO, Dell Computer, InternetWeek, Manhasset: Apr. 13, 1998. p. PG.8, 3 pages, downloaded from ProQuest Direct on the Internet, Jun. 1, 2005.*

Dell Extends Corporate Technology Management Tool . . . Dell Premier Page Saves Business Time, Money, Business Editors & Technology Writers. Business Wire. New York: Apr. 1, 1998. p. 1, 2 pages, downloaded from ProQuest Direct on the Internet, Jun. 1, 2005.*

Special Dell-ivery, Joseph E Maglitta. Electronic Business. Highlands Ranch: Dec. 1997. vol. 23, Iss. 12; p. 43 (7 pages), downloaded from ProQuest Direct on the Internet, Jun. 1, 2005.*

Dell's new deal, Dana Blankenhorn. Advertising Age's Business Marketing. Aug. 1997. vol. 82, Iss. 7; p. 27 (1 page), downloaded from ProQuest Direct on the Internet, Jun. 1, 2005.*

Direct Path to sales success: All childs play for today's computer kids and Dell-may-care. Strait Times, Singapore, May 6, 1997, 2 pages, downloaded from ProQuest Direct on the Internet, Jun. 1, 2005.* www.dell.com pages as of Jan. 30, 1998. downloaded from the Internet on Feb. 13, 2003, from www.archive.org, 19 pages.*

Bates, Allyson, Apple's next-generation systems, MacWorld, San Francisco, Jan. 1998, vol. 15, issue 1, p. 68, 8 pages, downloaded from ProQuestDirect on the Internet on Sep. 27, 2008.*

A+dvantage—Worldware, 1995, Jostens Learning Brochure.

Applied Physics, 1995, EduStar America Inc. Brochure.

Aqua Venture, 1995, EduStar America Inc. Brochure.

Barron, 1994, Authoring-Systems Software for Computer-Based Training (Educational Technology Publications, New Jersey), pp. 75-92.

Basic Electronics, 1995, Degem Systems Brochure.

Best, 1995, Degem Systems Brochure.

Brader, 1994, Authoring-Systems Software for Computer-Based Training (Educational Technology Publications, New Jersey) pp. 45-60.

Burke, 1994, Authoring-Systems Software for Computer-Based Training (Educational Technology Publications, New Jersey) pp. 123-141.

Carbonell, 1970, IEEE Transactions on Man-Machine Systems 11:190-203.

Cook, 1989, A Briefing for Buyers (Asymtote Inc., Boston).

Educating Jessica's Generation, 1995, Jostens Learning Brochure.

EduStar Mathematics, 1995, Innovative Technologies in Education Brochure.

Fall, III, 1994, Authoring-Systems Software for Computer-Based Training (Educational Technology Publications, New Jersey) pp. 143-164.

Guttman et al., 1998, "Agent-mediated electronic commerce: a survey," *The Knowledge Engineering Review 13*(2): 147-159.

Hello Blue Planet, 1995, EduStar America Inc. Brochure.

Hibbard, Justin, (Apr. 2, 1999), Assembly Online: The Web is changing mass production into mass customization, Information Week Online: News and Reviews (Online) Available Web Site: www.informationweek.com/729/build.htm; Accessed on: Oct. 30, 2001.

Home Reach, 1995, Computer Curriculum Corporation Brochure.

Keller, 1968, j. Applied Behavior Analysis 1:79-89.

Kimball, 1995, Educational Leadership 53:54-56.

Kulik et al., 1983, J. Educational Psychology 75:19-26.

Kulik et al., 1986. J. Educational Computing Research 2:235-252.

Lamb, 1994, Authoring-Systems Software for Computer-Based Training (Educational Technology Publications, New Jersey) pp. 24-44.

Learning First—New Edition, 1995, Jostens Learning Brochure.

Lesser, 1995, ACM Computing Surveys 27:340-342.

Lindsley, 1990, Teaching Exceptional Children 22:353-359.

Maes, 1994, Communications of the ACM 37:31-40.

Meet Lightspan, 1996, Lightspan Brochure.

O'Keefe and McEachern, 1998, "Web-based Customer Decision Support Systems," *Communications of the ACM 41*(3):71-78.

Osin, 1984, Proc. 4th Jerusalem Conf. on Information Technology, pp. 418-424.

Pasik, Alexander J. (Sep. 24, 1998), The Software Investor, *The Configuration Invasion*.

Peha, 1995, Educational Leadership 53:18-25.

Plato Learning System, 1995, TRO Learning, Inc. Brochure.

SageTalk: *Designing a Tool for Designing Successful Web-based Social Agents* (Paper ID 254); Conference '00, Month Jan.-Feb. 2000.

Sherry and Komoski, eds., 1990, The IIS Report pp. 3-6, 21-24, 52, 256-260.

Vass, Lisa (May 17, 1999), *Service Sites Buckle Up Configurators*, PCWeek Online (Online) Available Web Site: www.zdnet.com/pcweek/stories/news/0,4153,402639,00.html; Accessed on: Oct. 30, 2001.

Venezky and Osin, 1991, The Intelligent Design of Computer-Assisted Instruction (Longman, New York) chapters 3 and 7-13.

Writing Expedition, 1994, Ideal Learning Brochure.

Hibbard, Justin. (Apr. 12, 1999). Assembly Online: The Web is changing mass production into mass customization. Information Week Online: News and Reviews [Online] Available Web Site: www.informationweek.com/729/build.htm Accessed on: Feb. 28, 2000.

Pasik, Alexander J. (Sep. 24, 1998). The Configuration Invasion. Database [Online] Available Web Site: www.selectica.com/html/articles/Lazard1.html Accessed on: Feb. 28, 2000.

Vaas, Lisa. (May 17, 1999). Service sites buckle up configurators. PCWeek Online [Online] Available Web Site: www.zdnet.com/pcweek/stories/news/0,4153,402639,00.html Accessed on: Feb. 28, 2000.

Retro search results for Abandoned Shopping Cart Problem Article, 22 pp.

Ginger Koloszyc, Abandoned "Shopping Carts" Pose Major Challenge for Internet Retailers, Jul. 1999, pp. 41, 42, 44, Stores.

"Meet Lightspan—Lightspan's Management Team", http://www.lightspan.com/cgi-bin/ac, pp. 1-3, Apr. 18, 1996.

"Meet Lightspan—Expanding the Learning Environment", http://www.lightspan.com/cgi-bin/ac, pp. 1-4, Apr. 18, 1996.

Giuseppe Attardi, Antonio Cisternino, and Maria Simi, "Web-based Configuration Assistants", p. 1, 3, 5, 7, 9, 11 only.

Wendell Lansford, "Real-time interactive sales and services across the Internet: Optimizing the customer experience", Call Center Solutions vol. 17 No. 5, Nov. 1998, p. 1, 3, 5 only.

Office Action dated May 14, 2008 for U.S. Appl. No. 09/909,250.

U.S. Appl. No. 09/323,718, filed Jan. 19, 1999, Gau.

U.S. Appl. No. 09/518,916, filed Mar. 3, 2000, Lukas et al.

Afonso, J.L., Fuzzy Logic Techniques Applied to the Control of a Three-Phase Induction Motor, https://repositorium.sdum.uminho.pt/bitstream/1822/1685/1/Motor_97.pdf.

Ahmad, M., "Communication Network Planning Using Artificial Neural Networks," Singapore ICCS Conference Proceedings (1994) p. 810-813.

Amiri, A., "The Design of Service Systems with Queuing Time Cost, Workload Capacities and Backup Service," European Journal of Operational Research (1998) pp. 210-217.

Bakos, Y.B. et al., "The Emerging Role of Electronic Marketplaces on the Internet," Communications of the ACM, vol. 41, No. 8 (Aug. 1998) pp. 35-42.

Bright et al., "Service Creation in an Intelligent Network," IEEE Global Telecommunications Conference and Exhibition, vol. 1 (1989), pp. 137-140.

Brune et al., "A Resource Description Environment for Distributed Computing Systems," High Performance Distributed Computing, 1999 Proceedings, 8th International Symposium in Redondo, Beach, CA (Aug. 3-8, 1999) Los Alamitos, CA, pp. 276-286.

Carchiolo et al., "An Agent Based Platform for a Service Provider," NEC Research Index Online, http://citeseer.nj.nec.com/91085.html (1998) pp. 1-6.

Caruso, J, Standards Committee to Define Call Center Terms (industry reporting standards steering committee) (Technology Information) CommunicationsWeek, No. 608 (Apr. 29, 1996) (Abstract only reviewed and provided).

Chan, C. et al., Development of an Intelligent Case-Based System for Help Desk Operations, 1999 IEEE Canadian Conference on Electrical and Computer Engineering, Edmonton, Alberta, Canada, vol. 2 (May 9-12, 1999) pp. 1062-1067 (Abstract only reviewed and provided).

Damiani et al., "A Human Centered Agent-Based Architecture for Electronic Brokerage," Proceedings of the ACM Symposium on Applied Computing (1999) pp. 243-249.

Dewitt, R.T., "Expert Systems for User Service," ACM SIGUCCS User Service Conference XVII (1989) pp. 243-246.

Ferguson et al., "A Knowledge-based Sales Assistant for Data Communications Networks," IEEE, vol. 3, (Jun. 10, 1987) pp. 1634-1642.

Finke, M. et al., Inferring Disclosure Structure from Speech, Proceeding of 1998 Spring Symposium Series Applying Machine Learning to Discourse Processing (Mar. 23-25, 1998) pp. 25-32 (Abstract only reviewed and provided).

Hu, X. et al., "A survey of machine learning approaches to analysis of large corporations," School of Computing, University of Leeds, U.K. LS2 9JT.

Ishiwa et al., "An Expert System for Planning Private Networks," NEC Research and Development, Nippon Electric Ltd., Tokyo, Japan, vol. 35, No. 3 (Jul. 1, 1994) pp. 306-314.

Johnson et al., "Consulting Without Consultants: Expert Systems Applications in User Services," Proceedings of the 17th Annual ACM SIGUCCS Conference on User Services (1989) pp. 335-342.

Jungen et al., "An Intelligent Interactive Project Management Support System," European Journal of Operational Research, vol. 84 (1995) pp. 60-81.

Langkilde, I. et al., "Automatic Prediction of Problematic Human-Computer Dialogues in 'How May I Help You?'" AT&T Labs—Reseach.

Marsico, K., "Call Centers: Today's New Profit Centers," AT&T Technology, USA, vol. 10, No. 4, (1995-1996) pp. 14-18.

McNight et al., "Pricing Internet Services: Proposed Improvements," Computer, vol. 33 (Mar. 2000) pp. 108-109.

Mohri, M. et al., Weighted Finite-State Transducers in Speech Recognition, Computer Speech and Language (article submitted to).

Office Action dated Dec. 2, 2004 for U.S. Appl. No. 09/764,662, filed Jan. 18, 2001.

Office Action dated Jun. 22, 2005 for U.S. Appl. No. 09/909,250, filed Jul. 19, 2001.

Office Action dated Oct. 15, 2007 for U.S. Appl. No. 10/419,463.

Office Action dated Nov. 29, 2007 for U.S. Appl. No. 10/834,878.

Office Action dated Mar. 20, 2008 for U.S. Appl. No. 09/764,662.

Paek, T. et al., Optimizing Automated Call Routing by Integrating Spoken Dialog Models with Queuing Models (timpaek/horvits@Microsoft.com, Microsoft, Redmond, WA.

Peng, F. et al., Combining Naïve Bayes and n-Gram Language Models for Text Classification (f3peng.dale@cs.uwaterloo.ca).

Rahbari, R. et al., "Intelligent Tutoring System: An Expert-System Trainer for Herring Roe Grading," American Control Conference, 1997, Proceedings of the 1997, vol. 5 (Jun. 4-6, 1997) pp. 3171-3175.

Riccardi, G. et al., "A Spoken Language System for Automated Call Routing," International Conference on Acoustics, Speech and Signal Processing, USA (Apr. 21, 1997) pp. 1143-1146.

Schapire, G. et al., BoosTexter: A Boosting-based System for Text Categorization, (schapire@research.att.com; singer@research.att.com).

Schmidt, M.S., "Identifying Speakers with Support Vector Networks," Proceedings of 28th Symposium on the Interface of Computing Science and Statistics (Graph-Image-Vision) (Jul. 8-12, 1996) pp. 305-314 (Abstract only reviewed and provided).

Shriberg, E. et al., "Can Prosody Aid the Automatic Classification of Dialog Acts in Conversational Speech?," Language and Speech, USA, vol. 41 (1988) pp. 443-492 (Abstract only reviewed and provided).

Somers et al., "Intelligent Resource Dimensioning in ATM Networks," Proceedings of the International SWIT, vol. 2, SYMP 15 (Apr. 23, 2005, pp. 62-66.

Stenborn, D., Times flies, even waiting (bank telephone answering), Bank Systems Technology, vol. 30, No. 9, La Salle Nat. Bank, Chicago, IL (Sep. 1993) pp. 39, 41 (Abstract only reviewed and provided).

Struck, D.L., "Business Rule Continuous Requirement Envirronment. A Dissertation Submitted to the Graduate Council in Partial Fulfillment of the Requirement for the Degree of Doctor of Computer Science." Colorado Springs, Colorado (May, 1999).

Sun, J. et al., "Fuzzy Semantic Measurement for Synonymy and its Application in an Automatic Question-Answering System," http://pami.uwterloo.ca/pub/spodder/paper2.pdf.

Tang, M. et al., Call-Type Classification and Unsupervised Training for the Call Center Domain, (tagm, pellom hacioglu@cslr.coloardo.edu).

To use and abuse (Voice processing), What to Buy for Business, No. 166, UK (Jan. 1995) pp. 3-20.

Tsuchida et al., "Concept and Architecture of Intelligent Dynamic Service Provisioning (IDSP)," NNT R&D (1997) Author Abstract.

Vekiarides et al., "NetCap: A Tool for the Capacity Planning of Ethernet LANs," IEEE International Workshop on Modeling, and Simulation of Computer and Telecommunications Systems Proceedings (1998) pp. 198-203.

Wahlster, W., The Role of Natural Language in Advanced Knowledge-Based Systems, In: H. Winter (ed.): Artificial Intelligence and Man-Machine Systems, Berlin: Springer.

Walker, M. "Learning to Predict Problematic Situations in a Spoken Dialogue System: Experiments with How May I Help You?," ACM International Conference Proceedings Series, vol. 4 archive, Proceedings of the first conference on North American Chapter of the Association of Computational Linguistics, Seattle, WA (2000) pp. 210-217 (Abstract only reviewed and provided).

Weiss, "The Seamless, Web-based Library: A Meta Site for the 21st Century," http://internetquickreference.net/WebLib.pdf.

Whittaker et al., Interactive Voice Technology for Telecommunications for Telecommunications Applications: #10 Practical Issues in the application of speech technology to network and customer service applications, IVTTA 1998 Proceedings, 1998 IEEE 4th Workshop, (Sep. 1998) pp. 185-190.

Yu, C.F., "Customer Service Provisioning in Intelligent Network," IEEE Network Magazine, vol. 4 (1991) pp. 25-28.

Poleretzky Z et al: "The Call Center & e-Commerce Convergence" Dialog ABI/Inform(R), XP002949410 2001.

Attardi G et al: "Web-based Configuration Assistants" Artificial Intelligence for Engineering Design, Analysis and Manufacturing, London, GB, vol. 12, No. 4, Sep. 1998 pp. 321-331, XP002902516.

Non-Final Rejection dated Sep. 19, 2008 for U.S. Appl. No. 11/746,767.

* cited by examiner

User profile
114

| 202 | User identifier | |
|---|---|---|
| 210 | Domain familiarity | |
| | Product area 1 | 212-1 |
| | Customization process 1 | 214-1 |
| | ⋮ | |
| | Product area N | 212-N |
| | Customization process N | 214-N |
| 220 | Advisor interaction history database | |
| | General assistance requested | 222 |
| | Component related assistance | 224 |
| | Type of information consumed | 226 |
| | Acceptance of recommendations | 228 |
| | Rationales offered | 230 |
| 240 | Product preference database | |
| | Price sensitivity | 242 |
| | Budget | 244 |
| | Usage requirements | 246 |
| | Feature preferences | 248 |
| 250 | Product selection database | |
| | Historical purchase data | 256 |
| | By product type | 258 |
| | By usage requirement | 260 |
| | By price point | 262 |
| 270 | User interaction characteristics | |
| | Interest in interacting with advisor | 272 |
| | Interest in getting recommendations | 274 |
| | Average response time | 276 |
| | User interaction style | 278 |
| | ⋮ | |

Figure 2

SYSTEM AND METHOD FOR OPTIMIZING A PRODUCT CONFIGURATION

The present invention relates generally to a system and method for optimizing a product. More particularly, this invention relates to a dynamically invoked interface between a user and a sales module that provides assistance in optimizing one or more components associated with a product.

BACKGROUND OF THE INVENTION

The purchasing process involves an extended process of information gathering and decision-making by the buyer. In some cases, a variety of alternative product choices are available, differing in price and other characteristics. In other cases, the buyer configures a desired product by selecting among options for configurable elements of the product.

An effective salesperson begins the selling process with an information distribution phase in which the salesperson discloses general concepts relating to the product and specific product attributes. Based on this information, the customer selects a base product. The base product is either a single entity or an entity that includes a set of associated components. The salesperson helps the user customize the selected product by suggesting specific components to add to the base product and/or alterations to be made to components that may, by default, come with the base product. For each essential component associated with the base product, the salesperson helps the customer determine which component option is most appropriate for the needs of the customer. The salesperson also helps the customer evaluate optional components associated with the base product to determine if they should be purchased. Alternatively, in the case of a set of fixed product choices, the salesperson guides the buyer by incrementally changing a suggested choice based on systematically changing characteristics. In either case, the salesperson provides many types of important, timely, context sensitive information, suggestions and rationales to help the buyer make decisions. At times, the salesperson takes the initiative in leading the conversation while at other times the customer takes the initiative.

The approaches taken by the salesperson are adaptive. That is, throughout the sales process, the salesperson gauges customer characteristics, such as price sensitivity, interest in interacting with the salesperson, and experience level. The salesperson adjusts the sales pitch to match these characteristics. Thus, rather than pitching each of the available components associated with the base product in some predetermined inflexible way, the salesperson customizes his presentation to match the characteristics of the user.

Two types of electronic commerce software have been developed to aid users in the purchasing process. First, product selection software provides for the filtering of a set of products based on preferred product characteristics and desired uses. Second, configuration software allows a user to customize a product by selecting from lists of options and components provided by the software. Such configuration software is often used as a front-end for "build-to-order" manufacturing.

Typically, configuration software starts with a base system, selected by the user to satisfy a set of user goals as closely as possible. The configuration software provides a graphical user interface that presents a set of options that allow the user to customize each configurable element of the complete product. The configuration software often provides information about each option, usually as some form of specification sheet. Often, configuration software also provides information about each configurable element, such as the criteria for making a selection. Frequently asked questions may also be available. Configuration software often tracks constraints between choices of configurable elements. In some types of configuration software, option pairs that would violate such constraints are made unavailable. In other types of configuration software, the user is warned of any constraint violations as various options are selected. Deployments of configuration software, both as standalone applications and via networked systems, are available from Trilogy, Selectica, Calico Commerce, BT Squared and Siebel Systems.

Conventional electronic commerce configuration software focuses on the ease of selecting "correct" configurations, eliminating the need for human intervention by a salesperson or product expert. Much of the literature on configuration software emphasizes the savings provided by avoiding the "reworking" of inconsistent orders. But in eliminating the salesperson, such approaches also eliminate much of the personalized adaptive, heuristic behavior that make salespeople effective and helps to optimize both the shopping experience and final product choices.

Although existing electronic commerce sites utilize the above software tools to assist the purchaser, they do not provide methods comparable to that of a live salesperson. Some electronic commerce sites provide an electronic sales assistant that attempts to match the needs of the user to products on the electronic commerce site. Common product categories for which electronic sales assistants are currently used to select between pre-configured products include computers, automobiles, vacation destinations, pets, colleges and electronic devices. Sales assistance provided at sites that sell user configurable products, such as computers and automobiles, is far more limited.

But, as seen from such limited attempts at modeling the talents of a live salesperson, to date, no electronic commerce site has effectively reduced the personalized, heuristic, adaptive techniques of live salespeople to machine readable algorithms. For example, the deficiencies in the present use of electronic sales assistants to optimize the selection of a product from a set of pre-configured products is appreciated when the limitations of the features of representative implementations of conventional electronic sales assistants are examined. Representative electronic sales assistants include those offered by Ask Jeeves, Inc. on the etown.com site as "shop with Ida" and those offered by Silknet on the cozone.com site, as well as electronic sales assistants developed by America Online and found on aol.com and kaplan.com. These electronic sales assistants first elicit the goals of the user in terms of desired product features (such as manufacturer and weight), general usages (such as applications to be run), and budget. Existing electronic sales assistants provide either no recommendation or one or more recommendations based on either precise or approximate satisfaction of user goals. America Online ranks these recommendations in terms of how well they meet the goals of the user on a numeric scale while Silknet and Ask Jeeves cluster them within several categories of suitability. Also, the electronic sales assistants provide explanations, such as the ways in which a selected system meets the stated goals of the user (Ask Jeeves, America Online and Silknet).

The electronic sales assistants discussed above are unsatisfactory because they provide inadequate persistence within or across product optimization sessions. Thus, each iteration in the product optimization process is reduced to a "batch transaction," in which the user mentally maintains comparisons and any sense of progress towards the purchase goal. This burden placed on the user greatly reduces the believability and effectiveness of such electronic sales assistants. Additionally, there is no attempt to match the buying style of the consumer, in terms of the style of interaction desired or the level and kind of information offered. Nor is there any attempt at inferring information about the purchaser based on behavior during the purchasing session or prior sessions. This lack of individualization results in a "one size fits all" assistant aimed at the middle of the targeted audience.

Prior art electronic sales assistants provide only limited help for selecting between pre-configured products and techniques used by these assistants are not adequate to optimize a build-to-order product. Because existing electronic commerce sites have failed to identify methods for integrating the features of a lives sales process into their sales algorithms, they have a significant disadvantage relative to competing physical commerce sites such as retail stores. Accordingly, what is needed in the art of electronic commerce and electronic sales assistants is a system and method for assisting customers in the optimization of products in a manner that exploits the adaptive and heuristic approach of the live sales process.

SUMMARY OF THE INVENTION

The present invention provides a system and method for integrating the features of a live sales process into machine readable code. In the present invention, an advisor module gauges the characteristics of the user from diverse sources, such as user conduct while using the module and answers to questions posed to the user. The characteristics of the user are stored in a user profile. The advisor module coordinates with a sales module to provide the user with an interactive experience. Each user input and system response results in updating a subset of the characteristics in the user profile. Further, the updated user profile is used to determine the content of subsequent presentations made to the user. In this manner, the advisor module rapidly converges upon an accurate model of the characteristics of the user and, accordingly, appropriately gauges the sales pitch to these characteristics.

The method of the invention provides for the optimization of a product which includes a base product. As used herein, product optimization is achieved when the user indicates that he or she is satisfied with the product. In the method, an event record is accessed. The event record includes a summary of a sequence of events occurring during a preliminary product selection process. At a minimum, the summary includes an identification of the user and a preliminary designation of a base product. The user profile is obtained based on the identification of the user in the summary. The user profile includes at least one characteristic corresponding to the user. Based on one or more characteristics, selected from the set of characteristics in the user profile, a formatted display is generated and presented to the user. Further, one or more characteristics in the user profile are updated based on the nature of the formatted display and on the response of the user to the formatted display. The process cycles between presenting formatted displays to the user and updating the user profile until a first occurrence of a terminating event. In one aspect of the invention, a terminating event occurs when the user indicates that the product is optimized.

In one embodiment, the formatted display generated for the benefit of the user includes a set of options that are available for a particular component associated with the base product. Further, in one aspect of the invention, the response by the user to the formatted display includes a designation of one such option. When this is the case, the profile associated with the user is updated to reflect the fact that the user selected the option utilizing the assistance of the advisor.

Components featured in the formatted display are dynamically selected from the full set of possible components that correspond to the base product based on a function of one or more characteristics in the user profile. In one embodiment, the formatted display comprises a menu that includes elements such as the various options for a featured component, frequently asked questions associated with the component, a prompt to play an instructional sequence, and recommendation messages.

Another embodiment of the present invention provides a computer readable memory to direct a computer to optimize a product. A user profile database is stored in the memory. Each of the profiles stored in this database is uniquely associated with a different user and includes one or more characteristics of that user. Further, an advisor module is stored in the memory. The advisor module includes executable instructions designed to assist the user in optimizing a product. First, the module includes instructions for accessing an event record. This event record includes a summary of a sequence of events occurring during a preliminary product selection process. At a minimum, this summary includes an identification of the user and a preliminary designation of the product. Second, the module includes instructions for obtaining the user profile associated with the user from the user profile database. Third, the module includes instructions for providing a formatted display based on a function of one or more characteristics in the profile. Fourth, the module includes instructions for receiving a response to the formatted display and for updating at least one characteristic in the user profile based on the response. The instructions for providing a formatted display and updating the user profile are repeated until the first occurrence of a terminating event.

In one embodiment of the invention, the advisor module communicates with a client computer to produce a manifestation. This manifestation is designed to assist the user and therefore includes features such as a dynamic on-screen character, an audible voice, on screen text, a multimedia prop, and/or a sound effect. Further, when the manifestation is an on-screen character, the language, animations and gestures of the character are scaled to match the experience level and interaction style of the user.

BRIEF DESCRIPTION OF THE DRAWINGS

FIG. 2 illustrates a user profile in accordance with one embodiment of the present invention.

DETAILED DESCRIPTION OF THE INVENTION

The present invention provides a system and method for providing assistance in the optimization of a product that comprises a base product and a plurality of components associated with a base product. Three examples of products are (i), a computer and its associated components, such as hard disk drive options, RAM memory options, and computer monitor options (ii), a motor vehicle and its associated components, such as engine options, stereo options, and color and (iii), a customized service, such as a weekly maid and/or lawn service. In one embodiment, a user makes a preliminary designation of a product. In this embodiment, the preliminary designation includes default options for each of the components associated with the base product. In the case of a computer, for example, the base product may be a particular model of computer and the default options may include a default hard disk drive size, amount of RAM memory, and a particular computer monitor model. An advisor module then assists the user in optimizing the preliminary designation of the product.

Advantageously, the present invention continually updates a user profile associated with the user based responses to events in the component optimization process. Further, the updated user profile affects the approaches the advisor module uses to assist the user in subsequent component optimization steps. In this way, the optimization approaches used by the advisor module match the goals of the user. For example, based on the content of the periodically updated user profile, the advisor module will choose a subset of particular frequently asked questions from a database of frequently asked questions that uniquely match the characteristics of the user as identified in the updated user profile. In another example, the experience level of the user in purchasing products in the given product domain is continuously assessed and used to determine the quantity and content of help menus generated in subsequent component optimization steps. Another advantage of the present invention is that the advisor module is invoked by several different routes. In a first route, the advisor module is invoked by a standard sales module and in a second route, the advisor module is activated by a specific request by the user for assistance with a particular component associated with the base product or by a request for general assistance with the configuration process.

General Architecture

Figure 1:
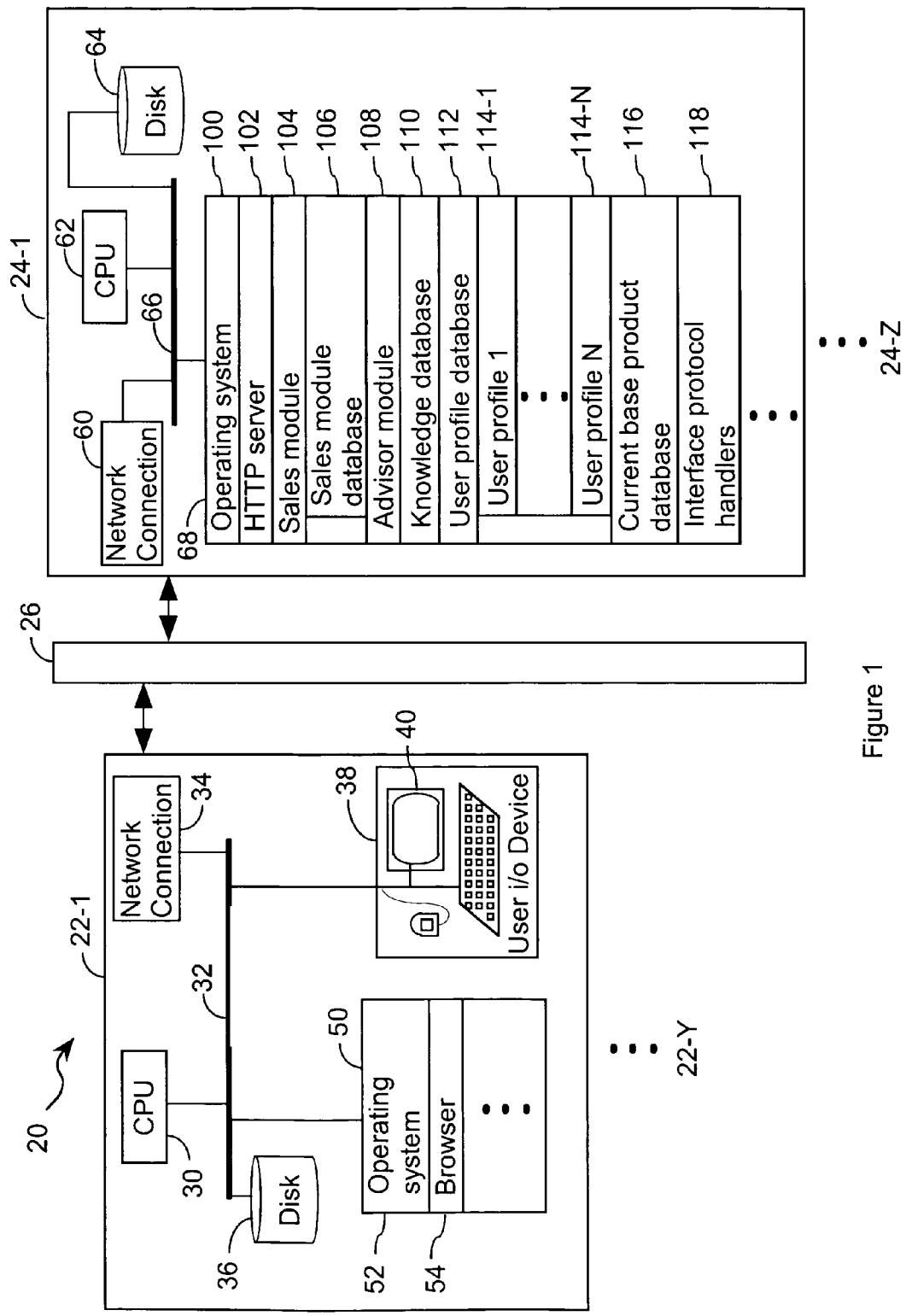
FIG. 1 illustrates a system for optimizing a product configuration in accordance with one embodiment of the present invention.

FIG. 1 illustrates a network 20 that is operated in accordance with the present invention. The network 20 includes at least one user computer 22 and at least one server computer 24. The user computer 22 and the server computer 24 are connected by transmission channel 26, which may be any wired or wireless transmission channel.

User computer 22 is any device that includes a Central Processing Unit (CPU) 30 connected to a random access memory 50, a network connection 34, and one or more user input/output ("i/o") devices 38 including output means 40. System memory 50 may also include read-only memory (ROM). Output means 40 is any device capable of communicating with a human and includes, for example, a monitor, voice user interfaces, and/or integrated graphic means such as mini-displays present in web-phones. Typically, user computer 22 includes a main non-volatile storage unit 36, preferably a hard disk drive, for storing software and data. Further, user computer 22 includes one or more internal buses 32 for interconnecting the aforementioned elements. In a typical embodiment, memory 50 includes an operating system 52 and an Internet browser 54.

Server computer 24 includes standard server components, including a network connection device 60, a CPU 62, a main non-volatile storage unit 64, and a random access memory 68. Further, server computer 24 includes one or more internal buses 66 for interconnecting the aforementioned elements. Memory 68 stores a set of computer programs, modules and data to implement the processing associated with the invention. In particular, a preferred embodiment of memory 68 includes an operating system 100 and a HTTP server 102.

Memory 68 further includes sales module 104 for providing the user with a set of available products. Using sales module 104, the user elects a base product from the set of available products. In a preferred embodiment, sales module 104 composes a web page that is transmitted by transmission channel 26 to client 22 and is displayed by browser 54 on computer display 40. In one embodiment, sales module 104 is implemented using configuration software from third party vendors to represent the set of available products. In one aspect of the invention, sales module 104 determines the set of available products by disabling invalid options for components associated with a base product and by providing warning messages that advise the user to not select certain combinations of options for the components associated with a base product.

In a preferred embodiment, sales module 104 provides information related to a subset of the components that are associated with the base product. Then, the user configures a permissible version of the selected base product using sales module 104. Sales module 104 provides the user with pricing information for each product in the set of available products based on pricing information stored in sales module database 106.

Memory 68 further includes an advisor module 108 for assisting a user in the optimization of a product selected by the user with the assistance of sales module 104. In one embodiment, the interactions between the user and sales module 104 are tracked. In one aspect, advisor module 108 is invoked when an interaction in a set of predetermined classes of interaction occurs. For example, advisor module 108 is invoked when the user selects a "sales advisor" button. As a second example, advisor module 108 is invoked when the user has selected a product from the set of available products and begins to use sales module 104 to configure the components associated with the base product. In this second example, the initial entry of the user into a sales module 104 is a type of event that invokes an instance of the advisor module. Accordingly, in one embodiment, the instance of the advisor module 108 invoked by sales module 104 introduces itself to the user, summarizes its capabilities, and incrementally determines the goals of the user.

An important advantage of advisor module 108 over prior art advisor applications is the methods used by the advisor module 108 to determine the goals of the user. For example, like prior art systems, advisor module 108 will query the user to determine the goals of the user. However, unlike prior art systems, there is no requirement that the user answer the questions in order to initiate advisor assistance and rigid nonadaptive approaches to product optimization are not used. Rather than using answers to questions as a sole source of data about a user, advisor module 108 determines the goals of the user from diverse sources of information, including information derived from a user associated profile 114, the interactions between sales module 104 and the user during the initial product selection, and available responses to questions posed by advisor module 108.

User profiles 114 are stored in a user profile database 112. Portions of user profile database 112 may be present in memory 68. Generally, however, user profile database 112 is stored on disk 64 and individual profiles 114 are fetched to memory 68 as needed. Memory 68 also includes a knowledge database 110 that includes information relating to each product in the set of available products offered by sales module 104. Knowledge database 110 further includes information about each of the options that are available for the components associated with an available base product.

Server 24 also includes a current base product database 116 which is stored on disk 64. Portions of the current base product database 116 are loaded into memory 68 as needed. Database 116 tracks the current base product selected by each user of system 20, and the components associated with such base products. A typical $n^{th}$ entry in database 116, for example, will indicate which option, from the set of options corresponding to component n, has been designated for a given base product. For nonessential components, one of the options that the user may choose for a component is a designation that the component will not be part of the optimized product. Further, database 116 includes a history of changes the user has made to the base product.

Finally, memory 68 includes one or more service routines such as interface protocol handler 118 for facilitating communication between sales module 104 and advisor module 108.

User Profile

User profile 114 contains data that is used to model the user. This data is continually collected and updated during a session between a user and sales module 104 and/or advisor module 108 and is maintained in user profile database 112 for use in subsequent sessions. User profile 114 is populated with data collected from sales module 104 through explicit user selections and data that is inferred from user actions. Explicit selections include user selections of product options such as options selected for a component and demographic data which may be used to compute shipping costs. User profile 114 data is also inferred from the manner in which the user interacts with the sales module 104. For example, when the user modifies an option for a component more than once, advisor module 108 infers that the user needs additional information on the component.

User interactions with the advisor module 108 are also used to populate user profile 114. In general, advisor module 108 will ask explicit questions to ascertain the requirements of the user at the beginning of an advisor module 108 session when such information is not available in the user profile 114. Advisor module 108 also determines the requirements of the user from user information consumption patterns, such as the frequency that the user accepts advice provided by the advisor module and the types of frequently asked questions and/or instructional sequences requested by the user.

Referring to FIG. 2, elements in an exemplary user profile 114 are illustrated. User profile 114 includes a user identifier 202 that is used to uniquely associate the user profile with a particular user of system 20 (FIG. 1). Further, user profile 114 includes a domain familiarity section 210 that tracks the familiarity of the user by product area 212. Such information can be, for example, gathered by tracking the quality and types of responses made by a user during the customization process for a product within the corresponding product area. Such corresponding customization process data 214 is stored within the domain familiarity 210 section of user profile 114. Advantageously, domain familiarity information 210 allows advisor module 108 to provide information, suggestions and explanations at appropriate times in the optimization method of the present invention. Further, domain familiarity data 210 enables advisor module 108 to use the formatted display that is most appropriate to the user. Domain familiarity data 210 is not necessarily stored by product area as illustrated in FIG. 2. Rather, in some embodiments, the data is stored according to a hierarchy of user knowledge domains. Storing the data in a hierarchy of user knowledge domains advantageously allows such information to be used to cross-sell additional components to the user at appropriate stages during product optimization.

User profile 114 includes an advisor interaction history database 220 that is used to compute and update elements of other portions of user profile 114, including product preference database 240 and user interaction characteristics 270. For example, a history of the number of times the user has asked for general assistance 222 is used as a factor to compute the interest the user has in interacting with advisor 272. In one embodiment, advisor interaction database 220 is populated with user provided answers to questions such as "would you like to me to suggest the best items for you?" In another embodiment, advisor interaction database 220 stores a calculation of the amount of advice the user would like based on factors such as the frequency that the user accepts advisor module 108 recommendations 228 or answers questions generated by advisor module 108. In a preferred embodiment, advisor interaction database 220 tracks the interest level in each component associated with a base product (224). Such interest levels are, in part, based on the type of information consumed by the user (226). This information includes the number and types of frequently asked questions (FAQs) that are chosen by a user for review and by the nature of the requests for advice that are made by the user.

In live sales pitches, care is taken to not repeat the same sales point or rationale too many times. Accordingly, advisor interaction database 220 tracks the rationales that have been offered to a user 230 in selecting a particular option for a component associated with the base product of interest. Rationales that have already been offered to a user by advisor module 108 more than a predetermined number of times during a particular session, or indeed, during a given number of past sessions, are down weighted.

User profile 114 includes a product preference database 240 that stores information about the user such as price sensitivity 242, budget constraints 244, usage requirements 246, and feature preferences 248. Product preference database 240 provides the tools that facilitate the provision of information and suggestions by advisor module 108 and help the module avoid providing information and suggestions that are less relevant to meeting the requirements of the user. For example, user price sensitivity 242 is used by advisor module 108 to filter candidate recommendations and to select those that are most likely to be accepted by the user. Typically, an important user requirement is the need to constrain the product to a specific budget 244. In some instances, the user will explicitly define budget 244 early in the optimization method of the present invention. In other instances, budget 244 is determined by advisor module 108 based on the choices the user made in selecting an initial product prior to product optimization.

In one embodiment of the present invention, advisor module 108 initially determines a price sensitivity 242 by considering factors such as the relative price of the selected base product compared to similar base systems. Another method is to consider the costs of the major components corresponding to the base product that have been chosen by the user. In cases where the product to be optimized is a computer system, one approach in accordance with this embodiment of the invention, will measure the relative price of the designated CPU clock speed and type. Then, the cost of the designated CPU clock speed and type is used to determine price sensitivity 242. In one aspect of the invention, the cost of the base system is combined with a statistical analysis of consumer spending patterns to compute price sensitivity. Such spending patterns include, for example, the average amount spent by consumers on other components as a function of CPU clock speed and type. An important advantage of the present invention is that price sensitivity is continually refined by advisor module 108 based on selections made by the user during the optimization process and the refined price sensitivity 242 affects the methods used by advisor module 108 in assisting the user with the optimization of a product.

Usage requirements 246 are used by advisor module 108 to calibrate the information and suggestions that advisor module 108 provides to the user. Typical usage requirements for the computer system product domain may be categorical, such as a designation as to whether the user is a consumer or is commercial, or quantitative. Quantitative usage requirements include, for example, an indication of the amount of Internet usage. As used herein, usage refers to factors such as the amount of bandwidth intensive applications a user requires, photo processing, tele-commuting, home office and related applications. Further, such usages are defined as current, projected or potential usages. In a preferred embodiment, the advisor module 108 will query the user for a ranking of predicted needs for each of the most typical uses of a particular base product. Preferably, such rankings are on a multi-level scale with a predetermined number of levels ranging from low to high and including a ranking such as "no opinion." In an alternative embodiment, usage requirements 246 are limited to a categorical list of usages that the user has indicated are of the most interest.

Figure 3:
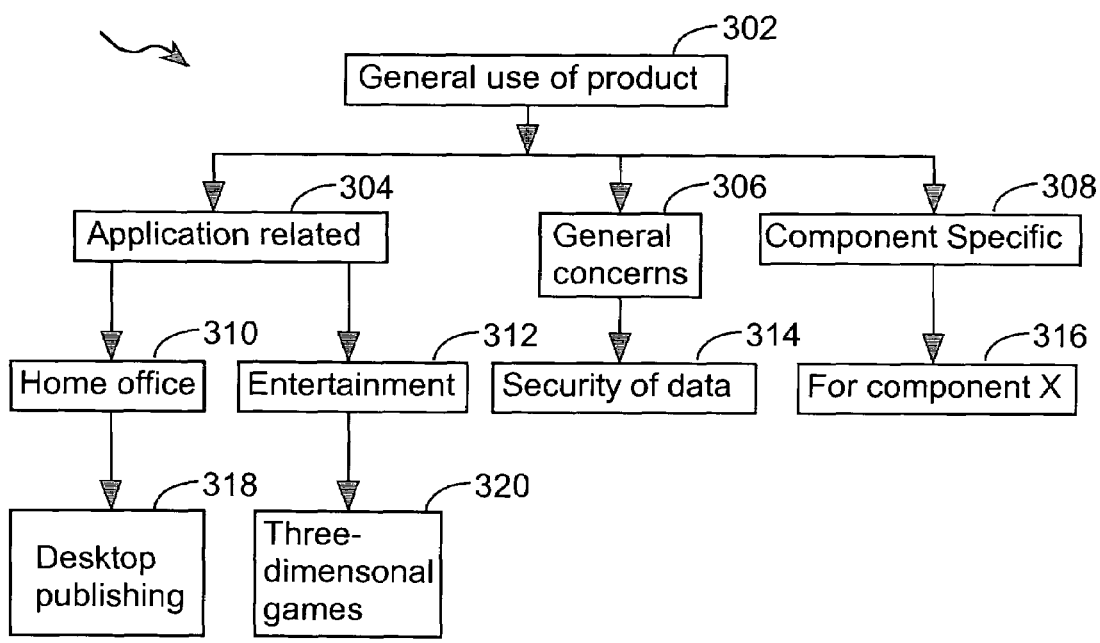
FIG. 3 illustrates one method of organizing user usage requirements in accordance with an embodiment of the present invention.

In one embodiment, usage requirements 246 are grouped into a hierarchy as shown in FIG. 3. In the embodiment illustrated in FIG. 3, more specific goals are given more weight than general goals. The requirements for the general use of a product 302 are represented as a hierarchical tree of requirements. At a first hierarchical sublevel, requirements are divided on the basis of whether they are application related 304, a general concern 306, or component specific 308. Application related requirements 304 are further differentiated based on whether they may be categorized as home office 310 or entertainment related 312. A representative home office related requirement 310 is the category desk top publishing 318. A representative entertainment 312 related requirement is the category of three-dimensional games 320. A specific application such as home office 310 has one or more specialized usages such as desktop publishing 318 which will carry more weight than their parent usages. An illustrative general concern 306 is the extent to which the user prefers that data be secure 314. In a typical embodiment, component specific requirements 308 are categorized on a component 316 basis.

In another embodiment, each of the requirements in the hierarchical tree shown in FIG. 3 is represented by a scale. One of skill in the art will appreciate that any number of different types of scales are possible and all such scales are within the scope of the present invention. The scale could be, for example, one that ranges from 0 (doesn't care) to +1.0 (absolutely wants/needs) or from −1 to +1 where −1 signifies the negation of a goal ("definitely does not want") as in the case of printing capability when the user already has a satisfactory printer.

Returning to FIG. 2, user profile 114 is a persistent profile. That is, information derived from previous sessions, in which the user optimized a product, is permanently retained by user profile 114. Thus, in a preferred embodiment, user profile 114 includes product selection database 250. Historical information is used to populate historical purchase data 256 entries by product type 258, usage requirement 260, and price point 262. This database is advantageously used when the user returns to purchase a similar product as in the case where the user is buying a second computer or when the user is purchasing peripheral products or services related to a previous purchase (e.g., a digital camera for a computer system).

User profile 114 further tracks user interaction characteristics 270. In general, user interaction characteristics 270 identify the interaction style and preferences the user has for interacting with advisor module 108. This includes the amount of interest the user has in interacting with advisor module 108 (272), the amount of interest the user has demonstrated in getting recommendations (274), the average response time (276) the user has exhibited in responding to past recommendations, and user interactions style (278).

Although FIG. 2 and FIG. 3 illustrate a structured approach to storing the information associated with a user, it will be appreciated that the present invention can be practiced using profile that includes significantly less information than the profile of FIG. 2. Indeed, any profile that uniquely identifies a user, includes at least one characteristic associated with the user, and is capable of being updated during the product optimization process is within the scope of the present invention. Representative characteristics include:
  a. the current goals of the user as a function of the ways the user plans to use the product;
  b. the goals of the user as a function of product attributes such as manufacturer or color;
  c. the goals of the user as a function of characteristics of the product such as durability;
  d. the desired general level of interaction between the user and the advisor module, as exhibited by the user in the past;
  e. the classification of the preferred social interaction type of the user, such as extroverted versus introverted;

f. the extent of the desire of the user to get recommendations from advisor module 108;

g. the extent of the knowledge of the user about product in the general domain of the product to be optimized;

h. the extent (level, type and amount) of desire the user has to review information related to the product;

i. the amount of advice that has already been provided to the user by advisor module 108 and/or sales module 104;

j. the interest in the user in specific components and qualities of components that correspond to the base product to be optimized; and k. the budget and price sensitivity of the user.

One of skill in the art will appreciate that the exemplary structure of user profile 114 provides a number of advantages. The specific requirements of a user are uniquely tracked by user profile 114. Such requirements may take the form of positive requirements, such as an amount of Internet usage, as well as negative requirements, such as an indication that the user "does not like inkjet printers." Further, profile 114 is continuously updated during the product optimization process to continually calibrate the format of the optimization process to the requirements of the user.

Knowledge Database

Figure 4:
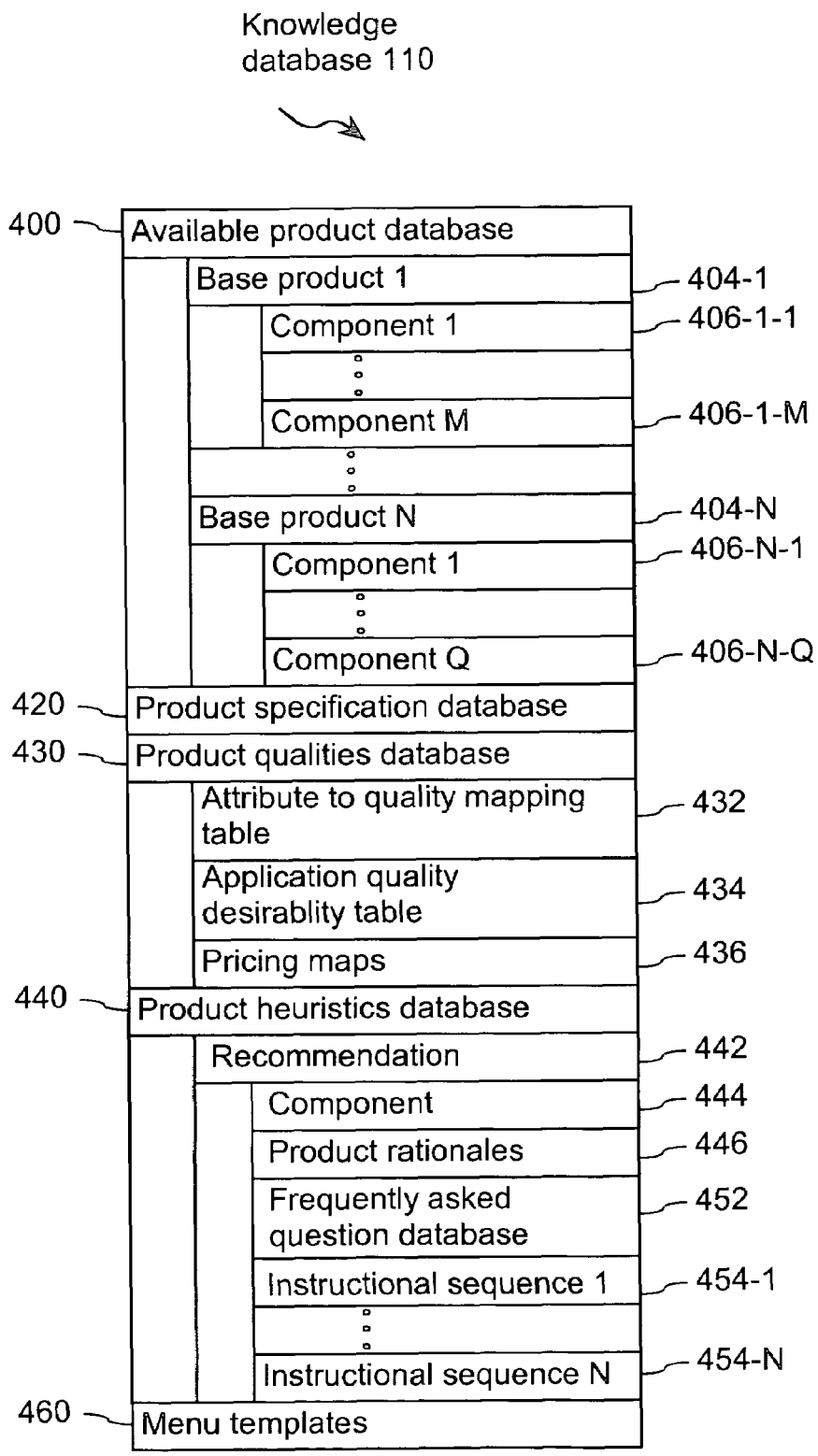
FIG. 4 illustrates a product and interaction knowledge database in accordance with one embodiment of the present invention.

In the methods of the present invention, advisor module 108 assists the user in optimizing a product by matching one or more characteristics associated with a user, as indicated in periodically updated user profile 114, with product attributes stored in knowledge database 110. Knowledge database 110 includes information about components associated with a product, the features of such components, questions that are frequently asked by users when optimizing a product (frequently asked questions), and the relationship between component options and typical user goals. FIG. 4 illustrates a knowledge database 110 in accordance with this aspect of the present invention. The illustrative knowledge database 110 of FIG. 4 is divided into five sections: an available product database 400, product specification database 420, product qualities database 430, product heuristics database 440, and menu templates 460.

Available product database 400 includes a list of available base products 404, components 406 that correspond to base product 404, and any relevant constraints. Each component 406 includes a set of available options. In a preferred embodiment, these options are referenced by stock keeping units (SKUs), absolute, or relative prices. It is anticipated that the content of available products database 400 is updated frequently, on the order of several times a day. Therefore, in one embodiment, advisor module 108 verifies that it is using the most up to date version of available product database 400 each time a user selects a new base product 404. Generally, available product database 400 is the only portion of knowledge database 110 that is accessed by both sales module 104 and advisor module 108. There is no requirement that available product database 400 be organized in the hierarchical manner shown in FIG. 4.

Product specification database 420 generally comprise two parts: (i) the specifications of the base product 404 and (ii) the set of specifications for each component 406 corresponding to a base product 404. Each specification is dependent upon the nature of the base product or component. For example, the specifications for a hard disk are size, type, and average access time. The data in product specification database 420 is used by advisor module 108 for (i), providing values for product attributes of options that are used in slots in the recommendations, rationales, frequently asked questions, and instructional sequences and (ii), mapping a component option into the appropriate ranges in product qualities database 430.

Product qualities database 430 includes the rating of the suitability of each specification or combination of specifications for each usage of each component 406. Thus, each quality in product database 430 is a composite or abstraction of one or more specifications (attributes) obtained from product specification database 420. Typically product qualities database 430 is indexed by product use or orientation. Product uses for a sport utility vehicle, for example, include child transportation, running errands, off-road sporting, and towing. Exemplary product orientations include categories such as "latest and greatest" and "budget-minded."

The configuration process used by sales module 104 (FIG. 1) starts with selection of a base product 404 (FIG. 4) with a default set of components 406 likely to be the closest to an "optimal" configuration. The user then optimizes the preliminary product designation by incrementally refining the options chosen for each component 406 associated with base product 404. In this manner, a product that best conforms to the individual requirements of the user is identified.

To facilitate the optimization process, product qualities database 430 provides a uniform means of offering recommendations and rationales related to the suitability of each component 406. Using attribute to quality mapping tables 432, application quality desirability tables 434, and pricing maps 436, database 430 encapsulates the qualities of each component 406 associated with a base product 404. For example, the suitability for each significant range of the $x^{th}$ quality of component 406 to the $y^{th}$ user requirement is stored in database 430. In one embodiment, this suitability factor is a numerical weight used by advisor module 108 to correlate various possible product configurations with the requirements of the user. A suitability factor may be selected from a desirability scale such as:

Null Irrelevant to user requirement y
1 Unsatisfactory for user requirement y
2 Barely adequate for user requirement y
3 Satisfactory for user requirement y
4 Very satisfactory for user requirement y
5 Outstanding for user requirement y Table 1 provides an example of an attribute to quality mapping table 432 in accordance with the present invention. Exemplary Table 1 is used by an advisor module 108 to help a user optimize a computer system. For each component 406, a quality, range, and product attribute values are listed. The attribute to quality mapping table 432 permits new component options to be added to or deleted from the product specification database 420 without the need to modify product qualities database 430.

TABLE 1

Exemplary attribute to quality mapping table 432

| Component 406 | Quality | Range | Product Attribute Values |
|---|---|---|---|
| hard disk | size | low | 4.0 to 10 gigabytes |
| | | medium | 10 to 20 gigabytes |
| | | high | greater than 20 gigabytes |
| | performance | low | ATA interface and 5400 RPM speed |
| | | high | (SCSI interface) or (ATA interface and 7200 RPM speed) |
| printer | print resolution | low | less than 600 by 600 |

TABLE 1-continued

Exemplary attribute to quality mapping table 432

| Component 406 | Quality | Range | Product Attribute Values |
|---|---|---|---|
| | | medium | 600 by 600 to 720 by 720 |
| | | high | greater than 720 by 720 |
| | speed | low | less than eight pages per minute |
| | | high | at least eight pages per minute |
| | photo realism | no | None |
| | | yes | PhotoRTe or color layering |

Table 2 is an exemplary application quality table 434 in accordance with the present invention. For each component 406, Table 2 quantifies the need for the component as a function of a potential application for the product. For example, in the case of a computer, the entry for a printer in Table 2 designates how suitable the printer is for particular applications such as desktop publishing and downloading music over the Internet. In this example, the printer has no relevance to downloading of music. Thus, if user profile 114 indicates that the only potential user application for the computer system is to download music, based on that usage, advisor module 108, aided by the information in application quality table 434, will not emphasize the purchase and selection of a printer during product optimization.

TABLE 2

Exemplary application quality table 434

| | | | | User defined applications | |
|---|---|---|---|---|---|
| Component | Quality | Range | General use (default) | Application 1 (home office) | Application 2 (downloading music) |
| hard disk | general need | | essential | essential | essential |
| | size | low | adequate | unsatisfactory | adequate |
| | | medium | satisfactory | satisfactory | satisfactory |
| | | high | satisfactory | very satisfactory | satisfactory |
| | performance | low | satisfactory | adequate | adequate |
| | | high | satisfactory | satisfactory | satisfactory |
| printer | general need | | average | very high | not relevant |
| | print resolution | low | adequate | unsatisfactory | not relevant |
| | | medium | satisfactory | adequate | not relevant |
| | | high | satisfactory | satisfactory | not relevant |
| | speed | low | satisfactory | satisfactory | not relevant |
| | | high | satisfactory | very satisfactory | not relevant |
| | photo realism | no | satisfactory | adequate | not relevant |
| | | yes | satisfactory | satisfactory | not relevant |

In one embodiment of the present invention, the information in attribute to quality mapping table 432 (FIG. 4), application quality desirability table 434 (FIG. 4), and price sensitivity 242 (FIG. 2) is combined by advisor module 108 to determine where a given option for a component 406 lies on a price grid. One price grid in accordance with the present invention lists the values of price increments based on the "price sensitivity" of the user and the quantity of improvement the user will experience if a particular option is replaced with a recommended option for a component 406. Preferably, the values in the price grid are obtained by marketing experts or generated automatically from information in product heuristics database 440. Alternatively a percentage of the price of base product 404 is used to calculate the values for the price grid thus simplifying the pricing information required for each component 406. An exemplary price grid is provided in Table 3. Values in this table may be used to filter candidates by specifying the required improvement in the desirability value over the current selection for the upgrade to be recommended.

TABLE 3

Exemplary price grid for a computer monitor

| Improvement in desirability value over current selection | High price sensitivity [$] | Medium price sensitivity [$] | Low price sensitivity [$] |
|---|---|---|---|
| low | 25 | 50 | 100 |
| medium | 50 | 150 | 200 |
| high | 100 | 200 | 400 |

Product heuristics database 440 (FIG. 4) comprises recommendations 442 that advisor module 108 offers to the user during product optimization. There are a large number of different forms of recommendations 442 used in the various embodiments of the present invention such as component recommendations 444, product rationales 446, frequently asked question 452, comparisons, selection reinforcements, definition of terms with benefits, and other information of benefit to the user. Templates are used to control the strength of recommendations 442 and the applications and qualities referenced in product rationales 446 that are provided to the user by advisor module 108.

Preferably, a component recommendation 444 includes a description of an option corresponding to a given component 406 in sufficient detail to distinguish the option from other available options for the given component 406. In one embodiment, this description is an abbreviated version of the description provided for the option as presented by sales module 104. For example, when an available option for a component 406 of a computer system 404 is "Advanced Audio J45 Super Woofer with Surround Sound," a corresponding component recommendation 444 is "Advanced Audio" when there are no other speaker options available from the manufacturer of Advanced Audio.

The present invention uses product rationales 446, which are reasons, consistent with the goals of the user, for selecting a component or component option. In a preferred embodiment, advisor module 108 will select a product rationale 446 that is most relevant to the requirements of the user and display this product rationale 446 concurrently with the component recommendation 444.

In one embodiment of the present invention, the different types of advice that are stored in component recommendations 444 are indexed by two tags. The first tag represents the specificity of the advice, on a scale ranging from general to specific. Specific advice references a particular option associated with a component 406. The second tag used to index component recommendations 444 is the amount of information in a particular component recommendation 444. At one end of the second tag, a component recommendation 444 provides only information about the corresponding component and no recommendation is provided. At the other end of this second tag, a component recommendation 444 provides a particular course of action together with only the most general information, such as an explanation that the suggested course of action "increases the quality of the product." An example of an item in the database 444 that is tagged as general and informational only would be "A disk with a SCSI interface will load data faster than the ATA interface," whereas the item "A SCSI interface loads your photos 50% faster than the same disk with an ATA interface" is also informational only, but more specific. An example of an item that is tagged as specific and provides a particular recommendation would be "You should get the 20.1 GB SCSI disk for only $50 more than the ATA interface because it will load your photos 50% faster."

In some aspects of the invention, the information present in component recommendations 444 is related to the product. Examples of information directed to the product includes guidelines of key components 406 of a product, the most demanding applications that the product can handle, and the overall price range of typical configurations of the product. In yet other aspects of the invention, the information present in a component recommendation 444 concerns specific components 406 in a product, such as component 406 functionality, component 406 interrelationships, component 406 qualities, or the procedure for adding component 406 to a base product 404 when the user already possesses base product 404 and is ordering component 406 at a later date. In additional aspects of the present invention, the information present in component recommendations 444 relate to the individual qualities of components 406, such as the benefit that the $n^{th}$ quality of a component 406 will have on an application to be accomplished with the product. An example of such a quality, in accordance with this aspect of the invention, is "look for print speed and paper handling capacity for home office applications."

In other aspects of the present invention, recommendations 442 are related to the system in general, such as the designation of an appropriate price range for a product or an indication of which components 406 are the most critical to the accomplishment of the stated requirements of the user. In other aspects of the present invention, recommendations 442 relate to specific components 406, such as the advantages and/or disadvantages of adding a particular component 406 to a base product 404.

In some cases, the content of a recommendation 442 is tailored to the preferences of the user as defined by user profile 114. For example, the following information is provided to a user which who is unlikely to respond to an unsolicited recommendation:

"Here's how I rate the color printers for photo print quality and speed."

| Component 406 | Print Quality | Speed |
|---|---|---|
| HP 895 | **** | *** |
| HP 822 | *** | ** |
| Epson 27 | *** | ** |

When user interaction style 278 is introverted, advisor 108 moderates the tone of the recommendation. For example:
"You should consider the HP895 printer at $259 because of its ability to print your photos in vivid color and its high speed."

When user interaction style 278 is extroverted, advisor module 108 strengthens the tone of the recommendation. For example:

"You should definitely get the HP895 printer at $259 because of its ability to print your photos in vivid color and its high speed."

An important advantage of the present invention is that advisor module 108 will generate a highly customized formatted display at each stage during a product optimization process. In one embodiment, the formatted display takes the form of a menu that includes the options that are associated with a particular component 406 in need at optimization. In addition, the formatted display will include a set of frequently asked questions 452 that are often asked by users when optimizing component 406. To generate this portion of the formatted display, advisor module 108 will query frequently asked questions (FAQ) database 452 using profile elements from the user profile 114 associated with the user. Thus, FAQ database 452 is filtered to yield FAQs of highest interest to the user. In one embodiment, user profile 114 elements that are used to filter FAQ database include applications, usages of interest to the user, component qualities and attributes of interest to the user, component qualities that affect the satisfaction level of the user as a function of product application, level of user knowledge of the given product domain, and qualities and/or attributes whose values differ between the current selection and selection to be recommended by advisor module 108.

Preferably, FAQ database 452 is populated with questions and answer templates for each component 406, qualities of components 406 and key applications impacted by the component 406. In one embodiment, FAQ databases 452 of the present invention are highly structured unlike conventional FAQ databases. Further, in one embodiment, FAQ database 452 contains definitions and descriptions about the operation of a component 406. For example, if component 406 is a hard disk, a representative FAQ is "how does a hard disk work?" Additionally, in one aspect of the invention FAQ database 452 includes questions that highlight less known qualities of the component 406. For example, if component 406 is RAM memory and one or more of the options include the ECC attribute, a corresponding FAQ may ask "what is ECC memory?" Additionally, representative FAQs define relevant units of quality that are used to describe the associated component 406. For example, in the case of a component 406 that is a hard drive, such a question may address and answer the question "what is a gigabyte?"

In yet another aspect of the invention, FAQ database 452 is populated with questions that reinforce the importance of a particular quality that formed the basis for which advisor module 108 recommended a particular component 406. For example, when advisor module 108 recommends a particular hard disk because the application determined that speed was an important quality, advisor module 108 will include a FAQ such as "Why is disk speed important?" in the formatted display. Other examples of such FAQs include the question "Why do I need more disk space?" in cases in which advisor module 108 judged that disk size is an important quality to optimize.

In still another aspect of the present invention, the formatted display generated by advisor module 108 includes FAQs that inform the user about qualities that advisor module 108 has determined should be considered by the user when comparing the various options available to the user for a component 406 and to educate the user on how to review a data sheet or other form of data that provides comparative information for the various options associated with a component 406. For example, in the case of a component 406 that is a hard disk for a computer system, an illustrative FAQ in accordance with this aspect of the invention is "What should be considered when selecting a disk?" Advantageously, the FAQs of the present invention include questions and answers for the most demanding applications for a component 406, criteria for the component 406 when considering a specific application and what's new in a component where the latest technology or features for a component are described (e.g., "What's new in printers?"). Further FAQ database 452 include questions and answers that address the difficulty or possibility of upgrading a component 406 at a later date (e.g., "How can I add more memory later?"). In order to help the user evaluate the default or their current selection, the FAQ includes questions about their specific selection. The answers are constructed from templates using data in product specification database 420.

Table 4 provides an exemplary list of questions in FAQ database 452 that relate to hard drive components 406.

TABLE 4

Exemplary entries in FAQ database 452 for hard drives

APPLICATION SPECIFIC CHOICES ( ) What are the implications of disk selection?
( ) Which are disk-critical applications?
( ) Tell me about disks and photo processing
( ) Tell me about disks and the home office
( ) Tell me about disks and downloading music
. . .
COMPONENT SPECIFIC CHOICES ( ) Explain how a disk works
( ) Tell me about criteria for selecting a disk
( ) Tell me about disk interfaces
( ) Tell me about disk speeds
( ) Tell me about disk size
( ) Tell me what is involved in expanding disk space after purchase
( ) Compare the disk you recommend to the one I have selected
( ) Show me the disk data sheet
. . .

In some embodiments of the present invention, the formatted display generated at each stage during an product optimization process provides the user with the option to review an instructional sequence 454 that provide more detail about a component 406 than what is typically found in a FAQ. Topics covered by instructional sequences 454 include how components 406 work, which components 406 are most critical to a product, and the relationship between components 406 and similar topics. In one embodiment, instructional sequences 454 are not general tutorials on subjects related to the system being optimized but, rather, are brief lessons presenting specific product concepts, product features, information about usage requirements. In one embodiment of the present invention, instructional sequences 454 have a presentation duration of approximately two to three minutes. In such embodiments, the instructional sequence occupies about three frames so that it does not interfere with the continuity of the product optimization. In one aspect of the invention, advisor module 108 will ask the user to evaluate usefulness of the instructional sequence 454 upon termination of the sequence based on criteria such as the appropriateness of the level of materials presented and the scope of the material covered during the sequence. Such feedback is used to update user profile 114 and to guide advisor module 108 in generating more appropriate formatted displays in subsequent optimization steps. For example, such information is used to determine when subsequent formatted displays should contain prompts for additional instructional sequences 454.

In a preferred embodiment, the formatted display presented to the user at each stage of the optimization process is in the form of a menu. Advisor module 108 generates the menu based on updated characteristics in the user profile 114. In one aspect of the invention, advisor module 108 selects a menu template 460 from knowledge database 110 and populates the template with elements selected from other portions of knowledge database 110, such as frequently asked questions, options associated with one or more component 406 to be optimized, a prompt to run an instructional sequence 454 (instructional sequence prompt), and recommendation messages. Recommendation messages of the present invention take several forms. In one form, a recommendation message reinforces a decision made by the user, (e.g. "That is a great choice"). In a second form, a recommendation messages invites the user to reconsider a choice or explicitly indicate which option the user should select for a given component 406 based on a characteristic in user profile 114.

In one embodiment, Advisor module 108 employs a plurality of strategies for determining which option or options for a component best match user profile 114. The recommendation algorithm computes answers to following types of questions:
  (a) After a user initiated change to the option for a component: "How much better or worse is the new selection in terms of qualities of the product option type relative to the user goals?
  (b) For providing a component option recommendation: "Which option for the component will best meet the goals of the user, such as budget?"
  (c) For recommending a component type: "What is the benefit of the component type towards meeting the user's goals?"
  (d) For recommending which component to change: "What is the best way to spend $x more or save $x?"

In one embodiment of the present invention, a best-fit algorithm is employed. This function maximizes the overall satisfaction level for all of the goals of the user. In this method, the satisfaction level relative to the goals of the user is computed for each option available for a component relative to the currently selected line item.

An exemplary recommendation algorithm is now described to illustrate how user profile 114 is combined with knowledge database 110 to provide rankings of options. The recommendation algorithm accesses usage requirements 246 and price sensitivity 242 as inputs from user profile 114 for the candidate ranking process.

Rankings for each option available for a component are computed by the following procedure:
  (a) Product specification database 420 is used in conjunction with the attribute to quality mapping table 432 to determine the appropriate range for each candidate option for each quality of the component.
  (b) Candidates are ranked using values in the application qualities desirability table 434 for the applications of interest to the user weighted by the importance of these applications to the user.
  (c) Candidates are further filtered using data from price maps 436 to select options that are likely to be accepted based on the price sensitivity 242 and budget 244 of the user.

In certain cases, it is more beneficial to raise goals above a satisfactory or barely adequate level rather than raising other goals to very satisfactory or outstanding. Using a non-linear scale as illustrated in Table 5, the recommendation algorithm favors selection of options that increase ratings of goals at the lower end of the scale. This corresponds to the real life situation that the perceived difference between unsatisfactory and satisfactory is larger than the perceived difference between satisfactory and outstanding. In some embodiments, a mathematical function is used instead of a lookup table.

TABLE 5

Exemplary non-linear scale to emphasize difference in lower rankings

| Ratings | Linear Scale | Non-linear scale (emphasizing differences in lower rankings) |
|---|---|---|
| Unsatisfactory | 1 | 1.0 |
| Barely adequate | 2 | 2.3 |
| Satisfactory for the usage | 3 | 3.4 |
| Very satisfactory | 4 | 4.3 |
| Outstanding | 5 | 5.0 |

Overview of Product Optimization

Figure 5:
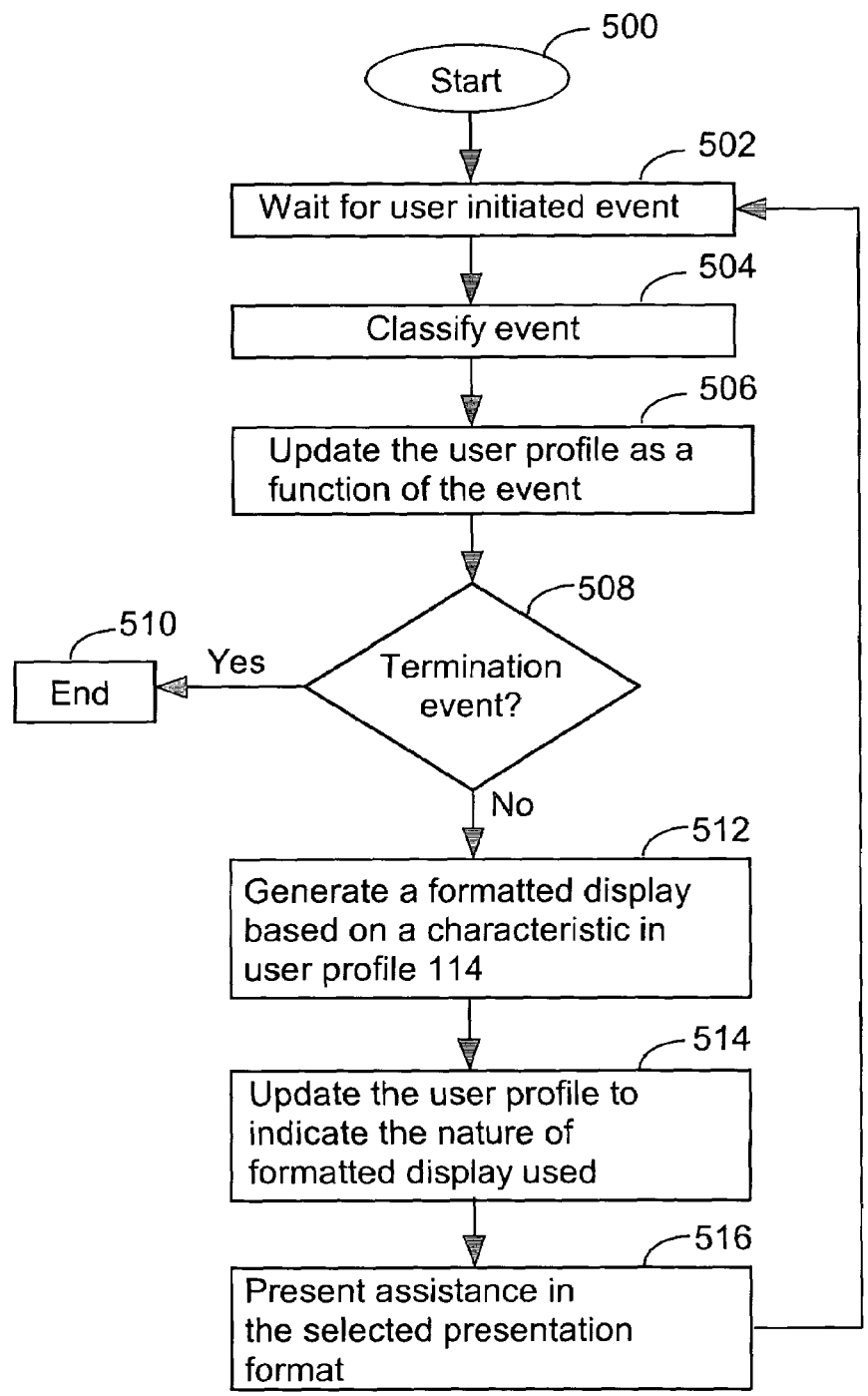
FIG. 5 is an overview of the processing steps used to provide assistance in optimizing a product in accordance with a generalized embodiment of the present invention.

The structure of various preferred systems and data structures in accordance with the present invention have now been disclosed. Attention now turns to FIG. 5, which provides a general description of processing steps that are in accordance with the present invention. In one embodiment, the processing steps of FIG. 5 are executed by an advisor module 108 on server 24 (FIG. 1). The logic used in FIG. 5 builds upon an important aspect of the present invention, which is product optimization performed by the repetition of the sequence:

```
begin loop
    wait for event
    exit loop if event is termination event
    act on event
    update user profile
end loop
```

The process begins in FIG. 5 with processing step 500. In one aspect of the invention, processing step 500 includes a step in which user profile 114 is accessed. Once the process begins, advisor module 108 waits for an event to occur (502). An exemplary event is a user generated request redirected from a sales module 104 (FIG. 1) in which the user requests assistance in choosing an option for a component 406 (FIG. 4) associated with the product of interest. The occurrence of an event 502 triggers processing step 504 (FIG. 5), in which the event is classified. Illustrative classifications for the event include the selection of an option for component 406, a request to view an instructional sequence 454, a request to view a frequently asked question, and a termination event. An important advantage of the present invention is that, once the event is classified, the user profile 114 corresponding to the user is updated (step 506) and the updated profile is used as a basis for determining how advisor module 108 will subsequently interact with the user.

When the event received in processing step 502 is termination event (508-Yes), the instance of advisor module 108 ends (510). Processing step 510 includes termination processes such as file clean up, modification of the user profile, and/or generation of a farewell display. When the event received in processing step 502 is not a termination event (508-No), processing step 512 is executed. In processing step 512, a formatted display is generated based on one or more characteristics in updated profile user 114. It will be appreciated that, in one embodiment of the present invention, one of the characteristics considered in the generation of the formatted display is the classification of event 502, which was stored in user profile 114 during processing step 506.

The formatted display generated in processing step 512 is selected from a broad array of different possible display formats. In one embodiment, the formatted display comprises a menu that includes one or more elements selected from knowledge database 110. However, there is no absolute requirement that the formatted display include a menu. In fact, it is possible that, depending upon the nature of one or more characteristics present in updated user profile 114, advisor module 108 will limit the formatted display generated in processing step 512. For example, it is possible that advisor module 108 will limit the formatted display to a single recommendation message, a single user-posed clarifying question, a reinforcement message, or indeed, no formatted display whatsoever. Once the formatted display has been generated (512), the user profile is updated to record the format type and content of the display (514). Importantly, this update ensures that in subsequent iterations of the processing loop illustrated in FIG. 5, advisor module 108 does not repeatedly generate formatted displays that have the same or similar content as the formatted displays of previous iterations. Finally, in processing step 516, the formatted display is presented to the user. Once the formatted display is presented to the user, the cycle has come to completion and the process repeats until the first occurrence of a termination event.

Runtime Embodiments

Now that an embodiment in which the general nature of the processing steps of the present invention have been disclosed, attention turns to the processing steps of runtime embodiments, which are in accordance with the present invention, so that important advantages of the present invention are highlighted. The first of these runtime embodiments is illustrated in FIGS. 6A thru 6C.

Figure 6A:
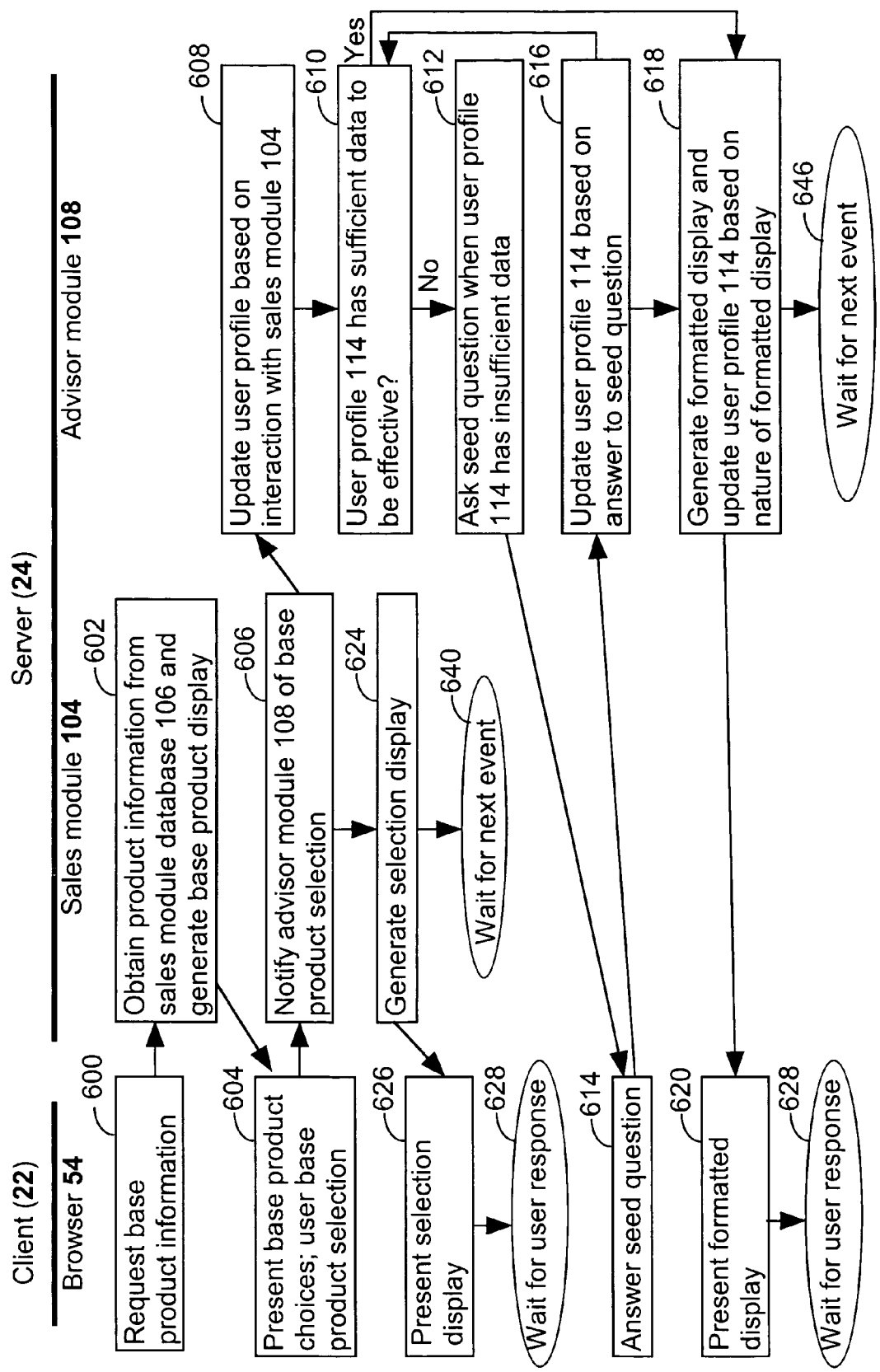
FIG. 6A illustrates processing steps used to initialize an interaction sequence between a client and server in accordance with one embodiment of the present invention.
Figure 6B:
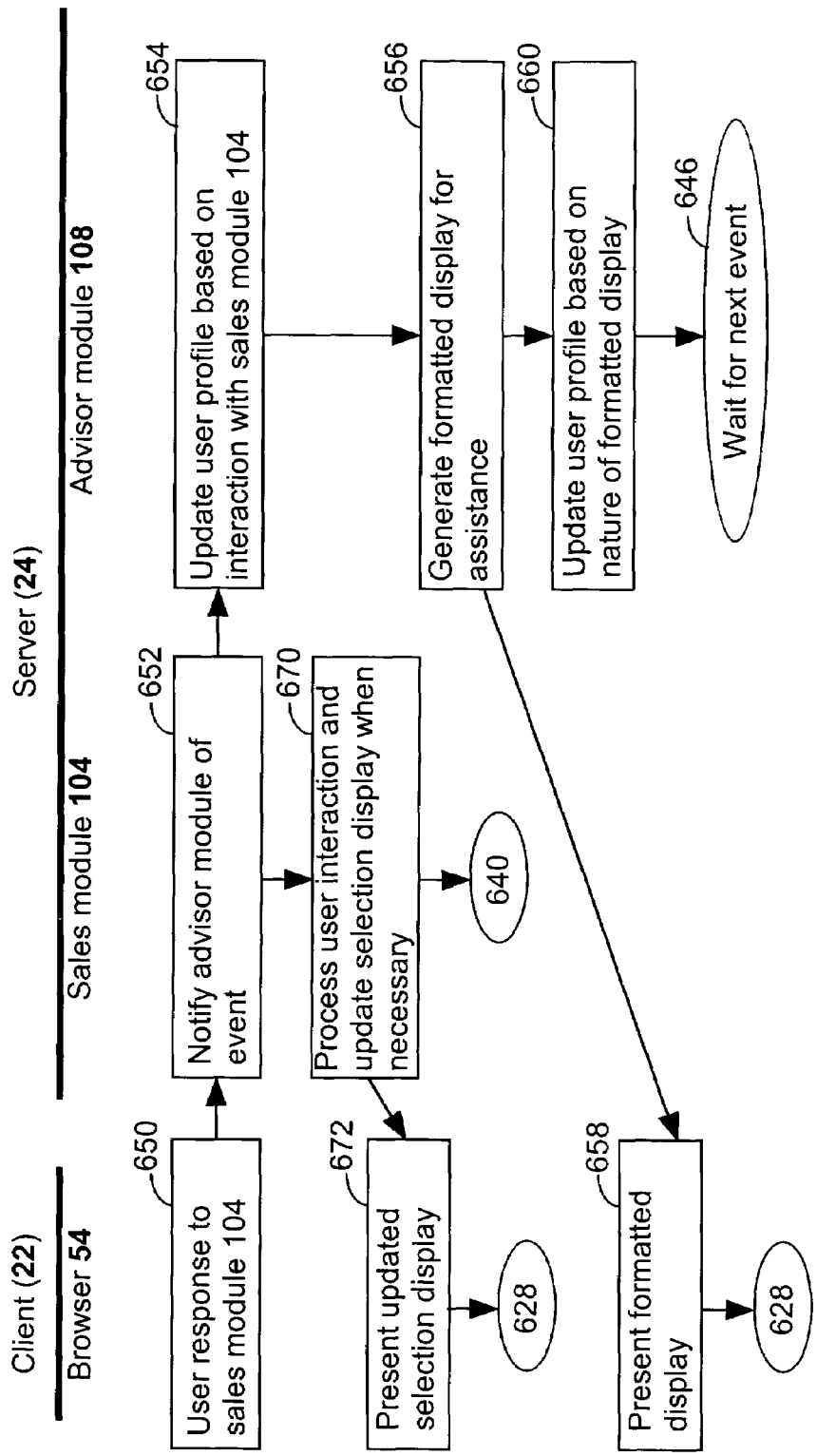
FIG. 6B illustrates detailed processing steps that are executed when a user interacts with a sales module in one embodiment of the present invention.
Figure 6C:
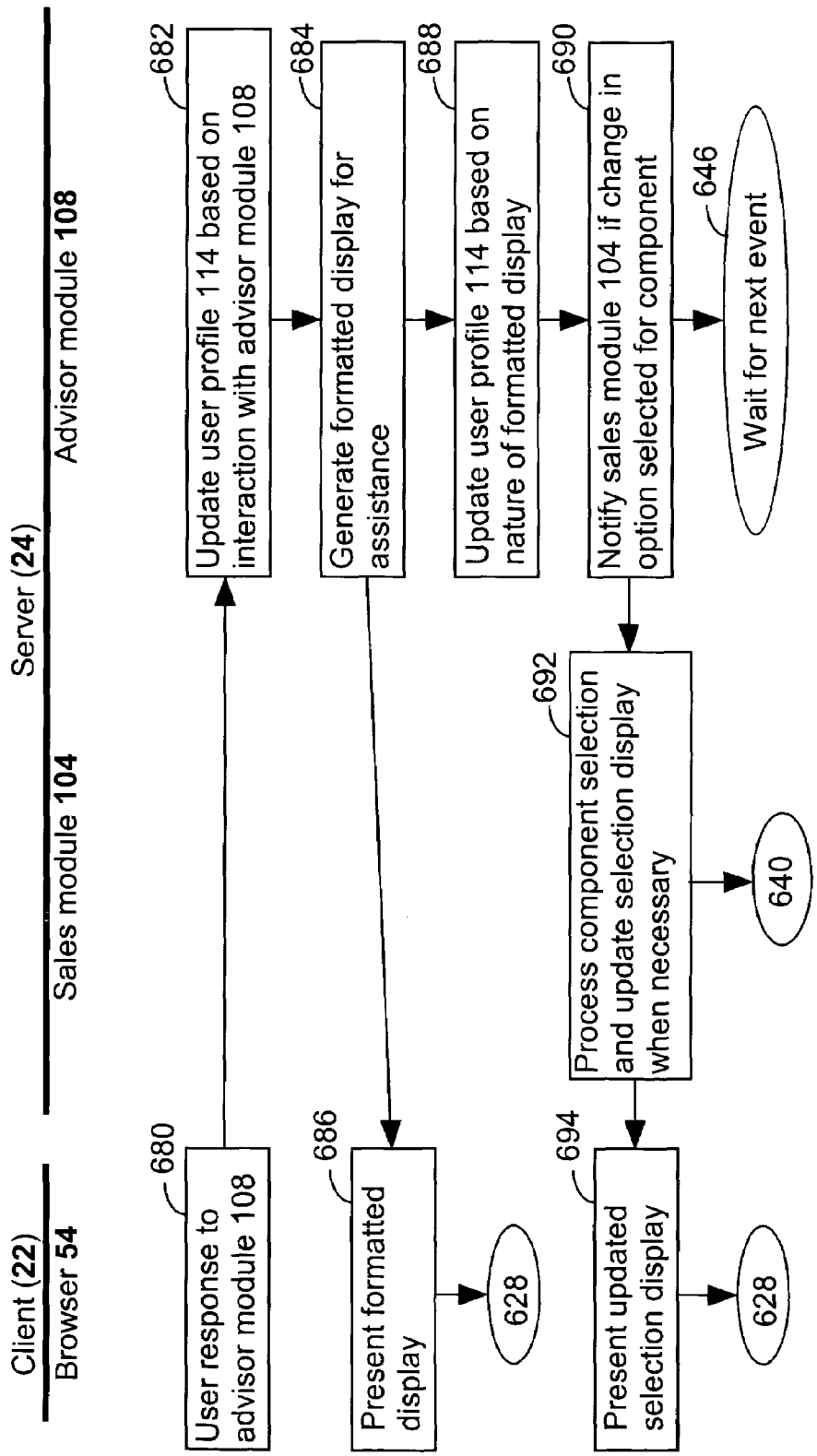
FIG. 6C illustrates detailed processing steps that are executed when a user interacts with an advisor module in one embodiment of the present invention.

In FIG. 6A, the interactions between three elements of system 20, browser 54, sales module 104, and advisor module 108, are disclosed. The process begins in FIG. 6A with step 600, in which a user requests base product information. As defined herein, a base product is any valid starting configuration for a product. Such valid configurations are to be broadly construed and are largely dependent upon the exact nature of the product. Three exemplary base products include a vehicle model, a computer processing unit type and/or speed, and a vacation package. In a first embodiment, a base product encompasses one or more components and in a second embodiment, the base product does not include any mandatory components. An example of the first embodiment is a base product that is defined as a central processing unit type and a computer display type. An example of the second class of embodiments is a vacation package that takes the form of a collection of components, including air travel, ground transportation, hotels and entertainment, none of which are mandatory. Further, as defined herein, a product is even more generally defined than a base product, and encompasses base products as well as base products together with one or more components.

In response to the request for base product information, sales module 104 obtains relevant product information from sales module database 106 (FIG. 1) and generates a base product display (602). In processing step 604, the base product display is presented by browser 54 and the user selects a particular base product from the selection. When the user selects a particular base product, sales module 104 is notified. In response to this notification, sales module 104 informs advisor module 108 of the selection of a base product by the user (606). In some embodiments, sales module 104 further notifies advisor module 108 of one or more interactions that occurred during the base product selection process, such as budget. In processing step 608, the information provided to advisor module 108 by sales module 104 is used to update one or more characteristics of a unique user profile 114 associated with the user. The particular characteristic that is updated in user profile 114 during processing step 608 is application dependent. For example, in one application, advisor module 108 infers price sensitivity 242, budget 244, usage requirement 246, and/or feature preference 248. After processing step 608, advisor module 108 determines whether user profile 114 has a sufficient amount of data to effectively assist the user in optimizing the product (610). Such data is gathered from the update of processing step 608, or prior instances in which the user has used system 20 to optimize a product.

It will be appreciated that one advantage of the present invention is that the organization of user profile 114 allows advisor module 108 to use information that has been gathered about a user from a prior optimization of a product even in instances where the prior product is completely unrelated to the product that is currently being optimized. When a determination is made that there is an insufficient amount of information in user profile 114 to effectively assist the user in optimizing the product (610-No), a loop is initiated in which advisor module 108 asks the user a seed question (612), the user answers the seed question using browser 54 (614), and one or more characteristics in the user profile 114 that corresponds to the user is updated based on the answer to the seed question (616). The loop consisting of processing steps 612, 614, and 616 is repeated in some embodiments until the profile is sufficiently populated. In other embodiments, the maximum number of times the loop can repeat is restricted by either an absolute value or a value that is a function of a characteristic in the profile, such as the interest in interacting with advisor 272 (FIG. 2). It will be appreciated, therefore, that in some embodiments the loop consisting of steps 612 thru 616 is skipped altogether even though advisor module 108 has determined that user profile 114 is inadequately populated. Further, the loop is skipped when advisor module 108 determines that user profile 114 is adequately populated (610-Yes).

The processing steps executed by advisor module 108 continues with the execution of processing step 618, in which advisor module 108 uses one or more characteristics from updated user profile 114 to generate a formatted display. Further, advisor module 108 updates user profile 114 to reflect the nature of the formatted display generated (618). Processing step 618 provides a distinct advantage over prior art systems and methods because an adaptive approach is taken to building the formatted display based on user characteristics rather than rigid predetermined menus. In some embodiments, the formatted display generated in processing step 618 comprises a menu that includes the various options available for one or more components associated with the base product of interest, one or more frequently asked questions associated with such components, a prompt for an instructional sequence 454 (instructional sequence prompt), and/or a recommendation message. Once advisor module 108 has generated a formatted display, it is communicated to browser 54 on client 22. Browser 54 presents the formatted display (620) and waits for a user response (628). Concurrently, after advisor module 108 has generated the formatted display and updated user profile 114 (618), the advisor module 108 waits for the next event (646).

Advantageously, in FIG. 6, sales module 104 and advisor module 108 operate in an asynchronous manner with respect to each other. Thus, after processing step 606, sales module 104 proceeds to processing step 624 while advisor module concurrently executes the series of processing steps beginning with processing step 608, as previously described. In processing step 624, sales module 104 generates a selection display and, in processing step 626, browser 54 presents the selection display to the user. After processing step 624, sales module 104 waits for the next event to occur (640). Similarly, after processing step 626, browser 54 waits for the user to respond to the sales selection display 628.

Because sales module 104 and advisor module 108 operate in an asynchronous manner, the user has the choice of interacting with sales module 104 or advisor module 108 at all times. For example, in FIG. 6A, sales module 104 and advisor module 108 concurrently wait for an event (640, 646). When the user responds thru sales module 104, the processing steps of FIG. 6B are executed and when the user responds thru advisor module 108, the processing steps of FIG. 6C are executed.

At this stage, the overall procedure used in the runtime embodiment of FIG. 6 can be appreciated. The flow of FIG. 6A is performed once for each selection of a base product. For each user interaction, either FIG. 6B or FIG. 6C is performed. It will be appreciated that, if the user interacts frequently with the advisor module 108, that the processes of FIG. 6C are generally executed more frequently than the processes of FIG. 6B. Table 6 provides examples of user actions that trigger execution of FIGS. 6B and/or 6C.

TABLE 6

Exemplary user interactions that trigger execution of FIG. 6B or FIG. 6C

| User action | Figure triggered | Advisor module 108 action |
| --- | --- | --- |
| Change in component selection | 6B | Offer a cross-sell presentation |
| Request of frequently asked question content | 6C | Show frequently asked question content |
| Request for specific option recommendation | 6C | Show formatted display including a menu having specific recommendations |
| Request another rationale | 6C | Show another rationale |
| Acceptance of recommendation | 6C | Show reinforcement of selection |

The process of FIG. 6B begins when the user interacts with a sales selection display (650). Generally, such an interaction arises when the user selects an element of a portion of a web page corresponding to the sales selection display presented by browser 54 (FIG. 1). A typical interaction with sales module 104 in processing step 650 of FIG. 6B is the selection of an option for a component 406 associated with the base product selected in FIG. 6A. Other typical interactions include a request to update the total purchase price of the product based on the current selections for the options, to add a component or base product to a "shopping cart," or generalized navigational command such as "previous page."

Sales module 104 notifies advisor module 108 of the user response (652). Advisor module 108 proceeds to update user profile 114 based on the interaction with sales module 104 (654). Advisor module 108 advances to the generation of a formatted displayed that will assist the user in optimizing a product (656). The formatted display is presented to the user with the assistance of browser 54 (658) and the browser waits for a user response (628). Further, advisor module 108 updates the user profile based on the nature of the formatted display generated in processing step 656 (660). After processing step 660, advisor module 108 waits for an event 646. After step 660 updates the user profile, if the triggering event is not a termination event, advisor module 108 advances to step 646 and waits for the next event.

In processing step 670, sales module 104 processes the user interaction of processing step 650 and updates a selection display. Further, the updated selection display is presented to the user by browser 54 (672). After processing step 670, sales module 104 waits for the next event to occur (640). Similarly, after processing step 672, browser 54 waits for the user to respond to the sales selection display (628). It will be appreciated that processing step 650 (FIG. 6B) is triggered when the user provides a response to a sales selection display generated by sales module 104 and that such a response is an event of the type that sales module 104 is waiting for in processing step 640 and that browser 54 is waiting for in step 628.

The process of FIG. 6C begins when the user interacts with a formatted display generated by advisor module 108 (680) or controls associated with the advisor module 108. Illustrative of such interactions is a request for advice on a component associated with the base product selected in FIG. 6A, request for general advice on, for example, the product domain, an interaction with an element of the formatted display presented in processing step 626 (FIG. 6A), or a time out arising from the fact the user has not responded to advisor module 108 for a period of time. Illustrative interactions with an element of the formatted display include a request for a recommendation, an acceptance or rejection of a recommendation, a request for additional reasons (rationale) for selecting a particular option for a component, a frequently asked question or short instructional sequence, an answer to one or more questions, or a request to close the formatted display.

In response to the user interaction of processing step 680, advisor module 108 updates one or more characteristics in user profile 114 (682) and generates a formatted display based, in part, on one or more characteristics in user profile 114 (684). The formatted display is communicated to client 22 and displayed by browser 54 (686). Further, user profile 114 is updated based on the nature of the formatted display generated in processing step 684 (688). If the user has made a change in an option selected for a component associated with the base product, advisor module 108 notifies sale module 104 of this change (690) and waits for the next event (646) if the triggering event is not a termination event. Sales module 104 processes the component selection identified in processing step 690 and updates the selection display when necessary (692) and waits for the next event (640). When an updated selection display is generated in processing step 692, the updated selection display is communicated to client 22 and presented by browser 54 (694). Then, browser 64 waits for a user response (628).

One of skill in the art will appreciate that an important advantage of the present invention is that it uses all available information about the user to determine the optimal way to present information rather than relying on fixed choices, predetermined procedures, and scripts. Thus, valuable information about the user inferred from user interactions with advisor module 108 are not lost, but rather, are used to customize the actions taken by advisor module 108 to the unique characteristics of the user.

Figure 7:
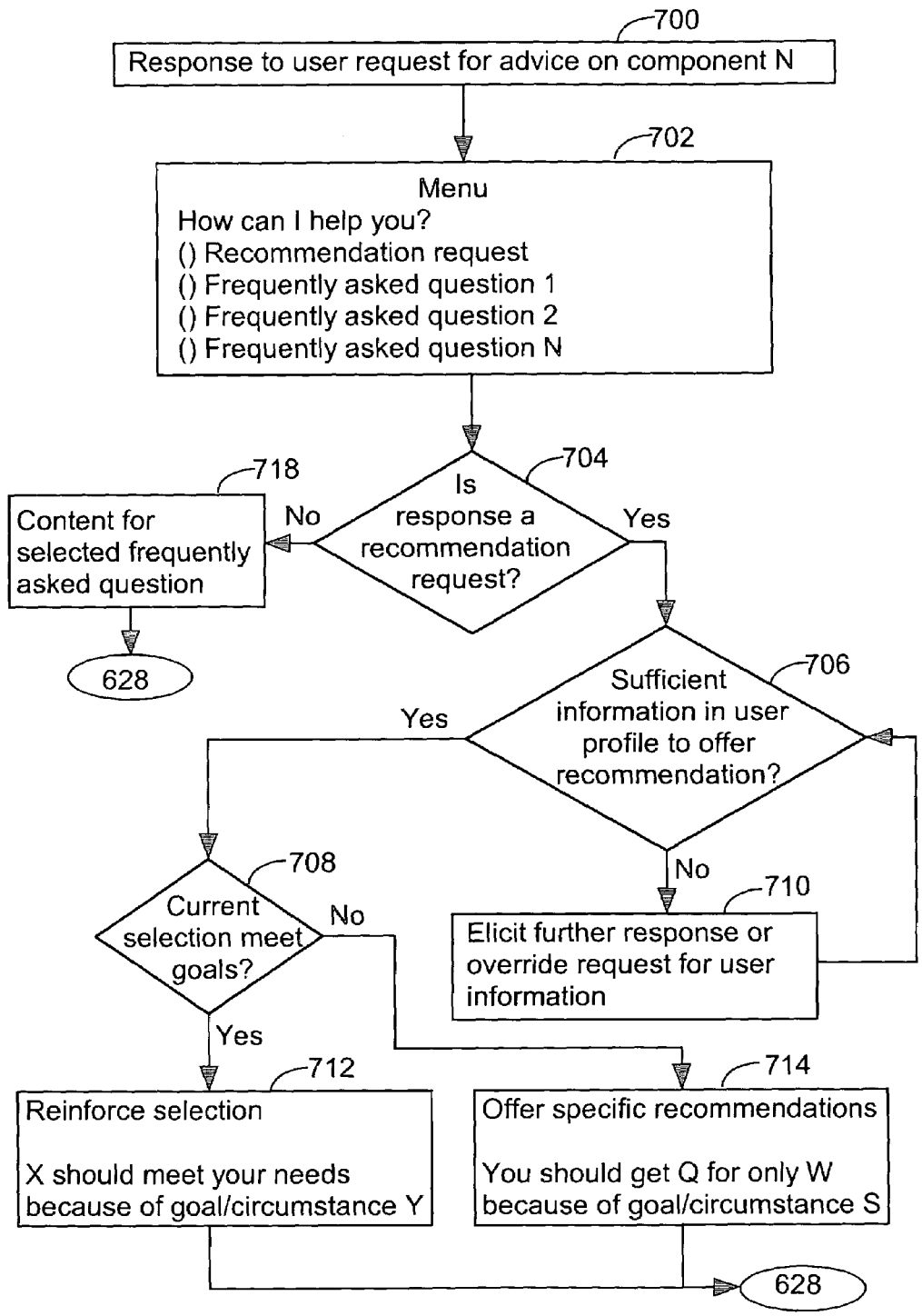
FIG. 7 illustrates the processing steps that are implemented in response to an exemplary user initiated request for advice on a component in accordance with one embodiment of the present invention.

FIG. 7 provides an application that uses the processing steps disclosed in FIG. 6C. In FIG. 7, an option for the component N has been designated. In response to a request for advice on a component N associated with a base product (700), advisor module 108 updates the user profile 114 associated with the user to reflect that a request for advice has been made. In the example illustrated in FIG. 7, advisor module 108 determines that the optimal formatted display is a menu that provides a recommendation request for the component, a set of frequently asked questions, and/or instructional sequences (702). The set of frequently asked questions and/or instructional sequences presented in this menu are selected from a larger set of such questions and sequences found in product heuristics database 440 (FIG. 4). Further, in one embodiment, the questions and instructional sequences are ranked based on relevance to user request 700.

One advantage of the present invention is that the user is not required to respond to the menu. For example, the user can simply ignore the menu provided by advisor module 108 and interact directly with sales module 104. When the user chooses to respond to the menu, advisor module 108 determines whether the response is a recommendation request (704). If the user selects a frequently asked question (704-No), advisor module 108 provides the content for the frequently asked question (718) and goes to the wait state 628.

When the user selects a recommendation request from menu 702 (704-Yes), advisor module 108 determines whether there is sufficient information in the user profile 114 to offer a recommendation (706). If there is insufficient information (706-No), advisor module 104 will elicit further response from the user or choose to proceed without sufficient information (710). If advisor module 108 chooses to proceed without sufficient information, it will offer the best advice possible in absence of such information. An illustration of a situation where advisor module 104 will choose to forgo requesting additional information, despite having inadequate user profile 114 data, is the case in which the characteristic "interest in interacting with advisor" 272 in user profile 114 (FIG. 2) indicates that the particular user has very little interest in providing information to advisor module 108.

When sufficient information to make a recommendation is present in user profile 114 or advisor module 108 decides to proceed in the absence of such information (706-Yes), advisor module 108 determines whether the current option designated for component N meets the goals of the user. If the currently designated option for component N meets the goals of the user (708-Yes), the option is reinforced with a statement such as "Option X should meet your needs because of goal/circumstance Y" (712). If the currently designated option for component N does not meet the goals of the user, advisor module 108 will offer specific alternative recommendations for component N (714). After either step 712 or 714 is executed, advisor module 108 returns to the state of step 646 (FIGS. 6A and 6C) and waits for the next event.

Figure 8:
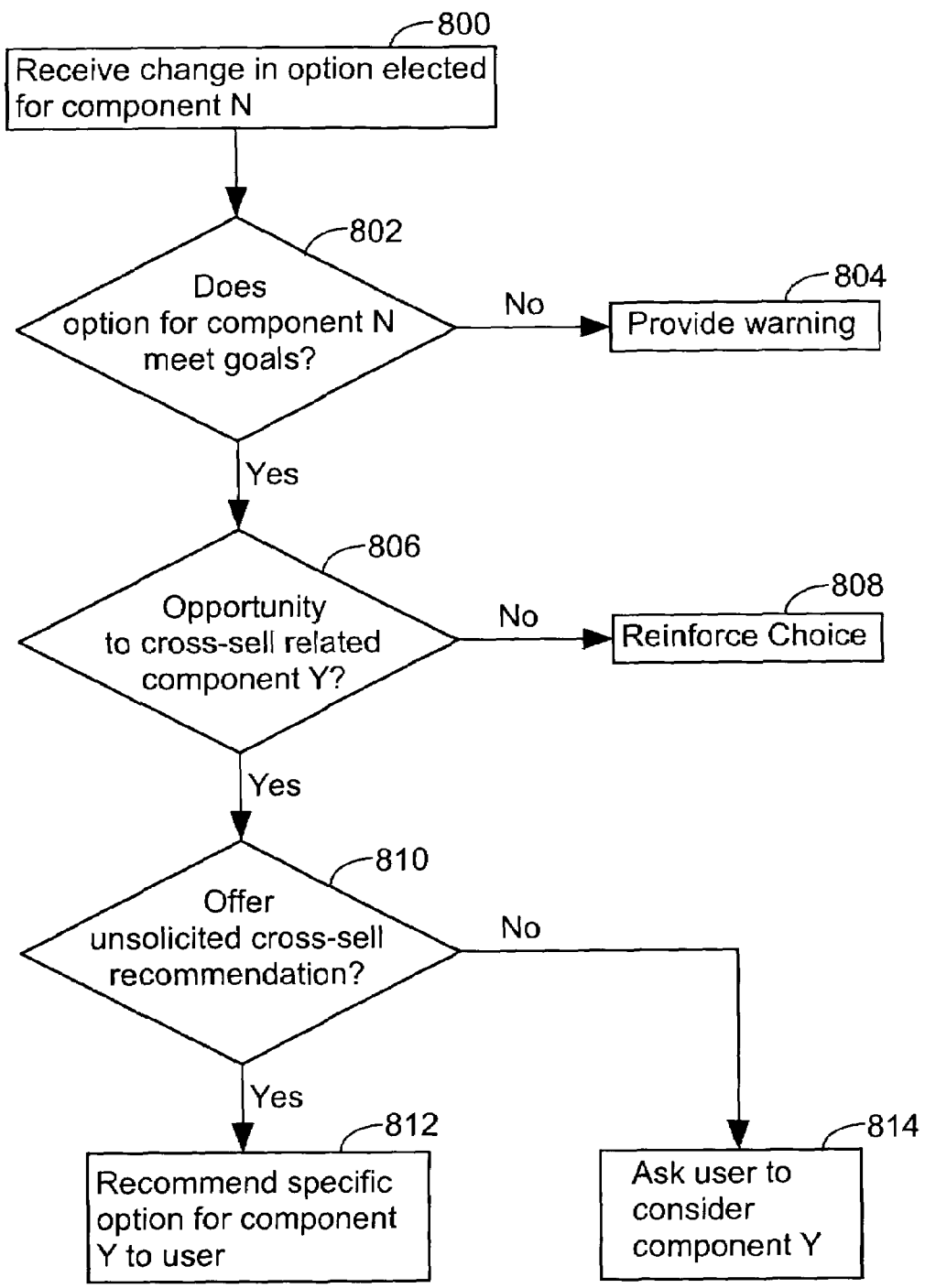
FIG. 8 illustrates the processing steps for initiating a cross-sell in accordance with one embodiment of the present invention.

Like FIG. 7, FIG. 8 provides an application that uses the processing steps disclosed in FIGS. 6B and 6C. In FIG. 8, the user changes an option designated for a component N associated with the base product of interest. Upon receiving notice of this change (800) from the sales module 104, advisor module 108 determines whether the newly designated option is correlated with the goals of the user as well as the merchant that is selling the product (802). Characteristics stored in user profile 114 are used in the determination of processing step 802. When the option does not meet the goals of the user or the seller (802-No), a warning message is provided 804. In one embodiment, the warning message comprises a sales pitch for a more expensive option N, thus furthering the interest the seller has in selling a more expensive overall product.

When the current option meets the goals of both the user and the seller (802-Yes), advisor module 108 determines whether it is appropriate to cross-sell related components related to the component that was changed in step 800 (806). A factor in this decision is the likelihood that the user will accept a recommendation from advisor module 108. Further, advisor module 108 will check which components are the most appropriate to cross-sell relative to the newly changed component based on the relationship of such candidate components to the newly changed component. In one example, advisor module 108 chooses to cross-sell a backup ZIP drive, but not a digital camera, when the user selects a hard drive.

Other factors used in the analysis of processing step 806 include the proximity of the placement of components within the display provide by sales module 104 and whether the candidate component has been previously considered by the user. Further, in one embodiment, the analysis in processing step 806 is assisted by a matrix provided by the seller that details the components which are most desirable to cross-sell for each component associated with a base product.

When advisor module 108 decides that a cross-sell is not appropriate (806-No), the module reinforces the change made by the user with a reinforcement message such as "That is a great choice!" (808). In one embodiment, the reinforcement message is followed by a rationale. When advisor module 108 decides to cross-sell a product (806-Yes), it determines which of two approaches to take in making the cross-sell (810). In the first cross-sell approach (810-Yes), advisor module recommends a specific option for candidate component Y (812). In the second cross-sell approach, the user is asked to consider candidate component Y but the advisor module 108 does not explicitly recommend which option should be selected for component Y (814). It will be appreciated that the updated user profile 114 plays an important role in decisions made in steps 802, 806 and 810.

Providing a Formatted Display

Figure 9:
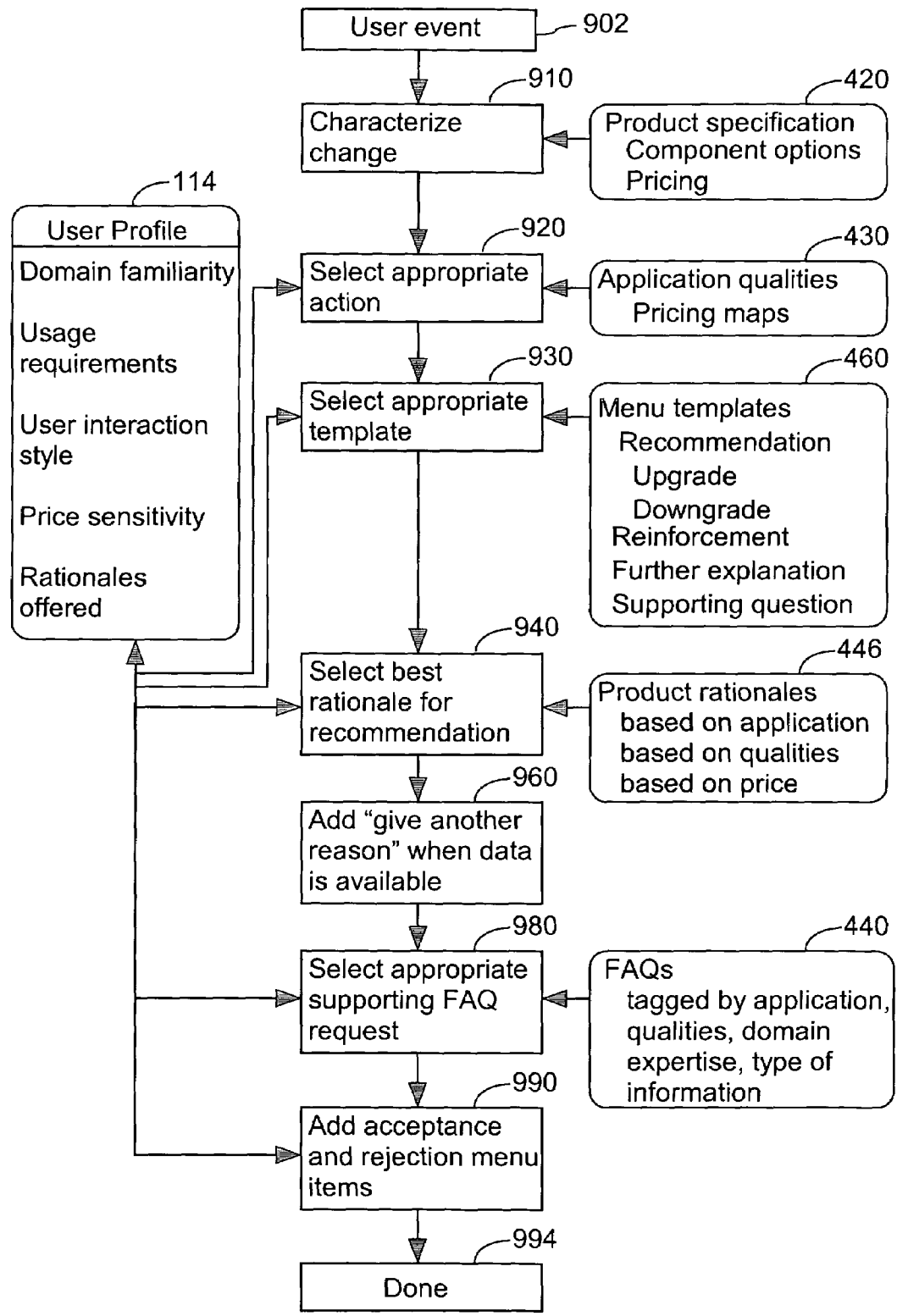
FIG. 9 illustrates the processing steps taken to create a formatted display in accordance with one embodiment of the present invention.

FIG. 9 illustrates the processing steps taken to generate a formatted display in an exemplary embodiment of the present invention. In some embodiments, the processing steps of FIG. 9 are used, for example, in step 512 of FIG. 5, step 618 of FIG. 6A, step 656 of FIG. 6B, and/or step 684 of FIG. 6C.

In FIG. 9, a user event triggers advisor module 108 to generate a formatted display (902). In processing step 910, advisor module 108 characterizes user event 902. In one embodiment, the user has selected a base product and, in processing step 910, advisor module 108 collects data from product specification database 420 that is related to the base product. Relevant information includes which components are available for the selected base product, the cost of the base product, the cost of each option available for each component related to the base product, and physical descriptions (e.g., hard disk drive size) of each of these options. Once information has been collected from product specification database 420, advisor module 108 selects appropriate action (920). In one embodiment an appropriate action is an appropriate recommendation. In such embodiments, an appropriate recommendation is made by correlating available options, which are determined in processing step 910, with application qualities from product qualities database 430, or other user characteristics obtained from user profile 114. It will be appreciated that one of the actions that advisor module 108 is capable of selecting in processing step 920 is to take no specific action whatsoever.

Once advisor module 108 has determined what kinds of recommendations should be made in order to optimize the product identified by the user, the module will select one or more appropriate templates for the formatted display that is presented to the user (930). The templates are chosen from the available templates found in menu template 460 (FIG. 4). Illustrative templates include recommendation messages, including upgrade and downgrade option messages, reinforcement messages such as "great selection," further explanations, supporting questions, and instructional sequences.

In processing step 940, advisor module 108 selects the best rationales for the recommendations adopted in processing step 920. Processing step 940 is advantageous because it correlates user characteristics from user profile 114 with a library of product rationales 446 found in knowledge database 110 and only uses the subset of rationales in the library of rationales that will most likely be appreciated by the user. Further, because user profile 114 is updated using all interactions between the user and advisor module 108, the user profile rapidly converges on the exact characteristics of the user, thereby improving the selection process of step 940.

In some embodiments, advisor module 108 selects additional elements for the formatted display. One exemplary class of additional elements are suggestions, such as "give another reason for picking component X/option Y," that are added in step 960. Another exemplary class of additional elements are frequently asked questions (FAQs), which are selected in step 980. The particular FAQs selected in step 980 are chosen from FAQ database 452 (FIG. 4) based on one or more user characteristics found in user profile 114. Finally, standard navigational tools, such as "accept" and "reject" are added to the formatted display when appropriate (990). The process finishes in 994 with the posting of the formatted display in browser 54 (FIG. 1).

An exemplary formatted display in response to a user request for a recommendation is provided in Table 7. The recommended option is described in sufficient detail to distinguish it from other disks with the same capacity. The rationale in the recommendation corresponds to a significant improvement in a quality of the component for an important usage. The menu elements allow the user to accept, reject, or get further reasons for accepting a recommendation. The frequently asked question selected for the user are based on user profile 114 elements such as usage requirements of interest to the user, domain knowledge of the user and previous consumption of frequently asked questions.

TABLE 7

| Exemplary formatted display with recommendations |
|---|
| You should get the 13.6 gigabyte disk with ATA66 interface. It will load your images up to 30% faster. |
| ( ) Give me the ATA66 interface for only $25 more<br>( ) No thanks, I will stay with the ATA interface<br>( ) Give me another reason<br>( ) What is an ATA66 interface?<br>( ) Tell me about disks and photo processing<br>( ) What is involved in updating a disk after getting the system? |

Updating User Profile 114

Figure 10:
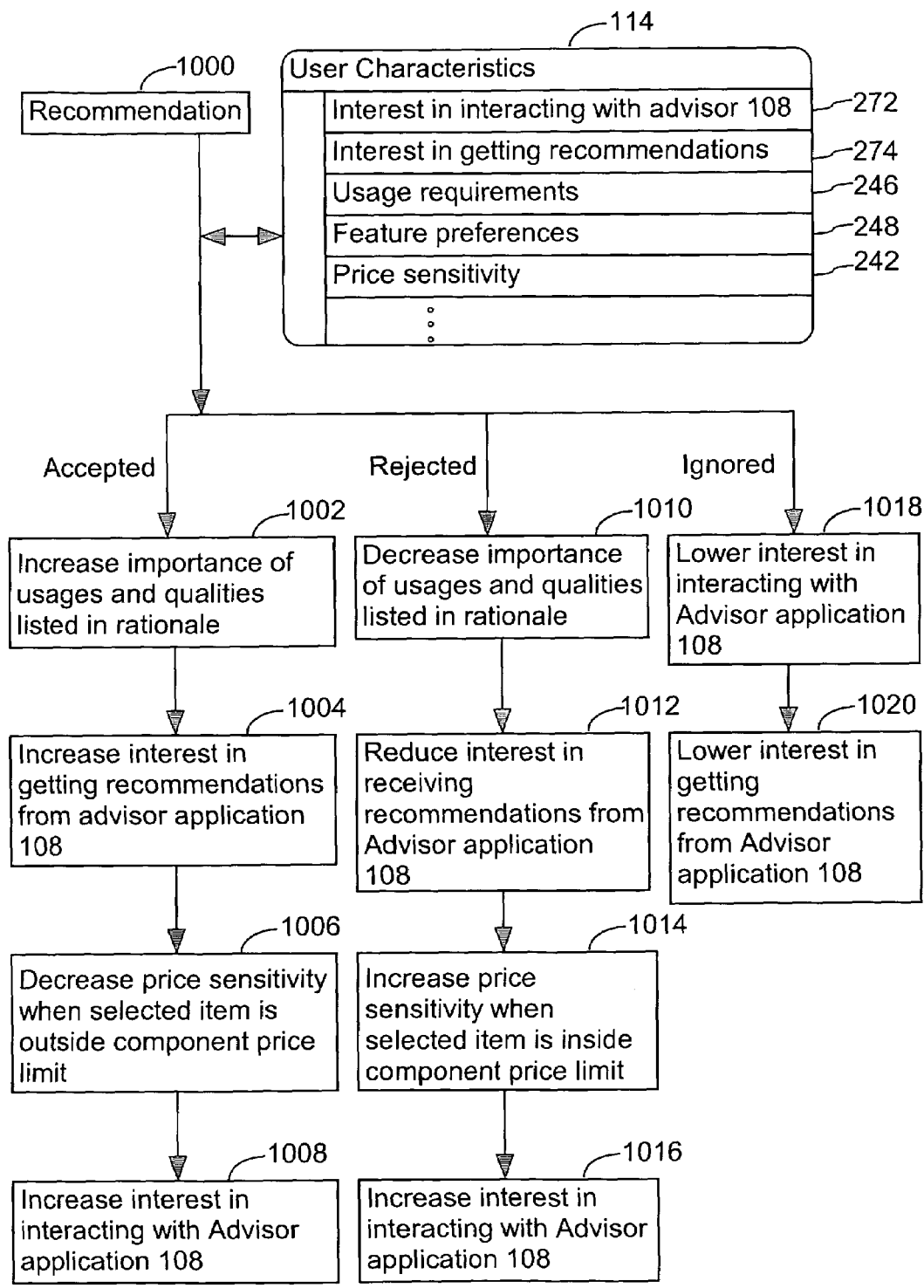
FIG. 10 illustrates an exemplary process for updating characteristics of a user profile based on response to a recommendation in accordance with one embodiment of the present invention.

FIG. 10 illustrates a method of updating user profile 114 in accordance with the present invention. The illustrative embodiment shown in FIG. 10, is initiated when the user accepts, rejects, or ignores a recommendation (1000). This response is used to update characteristics in user profile 114 such as "interest in interaction with advisor 108" 272, "interest in getting recommendations" 274, usage requirements 246, feature preferences 248, and/or price sensitivity 242.

In FIG. 10, when the user accepts the recommendation (1000-accepted), processing steps 1002 thru 1008 are executed. In processing step 1002, the importance of usages and qualities that are listed for a rationale used to support the recommendation are up-weighted. Further, the importance of user profile characteristics "interest in getting recommendations" 274 from advisor module 108 and "interest in interaction with advisor 108" 272 are up-weighted (1004, 1008) while the importance of the user profile characteristic "price sensitivity" 242 is down-weighted (1006) when the selected item is outside the component price limit.

When the user rejects the recommendation (1000-rejected), processing steps 1010 thru 1016 weight characteristics in user profile 114 differently than in the case when the user accepts the recommendation. For example, in processing step 1010, the importance of usages and qualities that are listed for a rationale used to support the recommendation are down-weighted. Further, the importance of user profile characteristics "interest in getting recommendations" 274 from advisor module 108 and "interest in interaction with advisor 108" 272 are down-weighted (1012, 1016) whereas the importance of the user profile characteristic "price sensitivity" 242 is up-weighted (1014) when the selected item is inside the component price limit.

When the user ignores the recommendation (1000-ignored), the importance of the characteristics "interest in interacting with advisor 108" 272 and "interest in getting recommendations from advisor 108" 274 are down-weighted (1020).

Exemplary Graphical User Interface

In one embodiment, manifestations of advisor module 108 and sales module 104 are displayed simultaneously by web browser 54. For example, in one embodiment, advisor module 108 and sales module 104 manifestations are represented by separate hypertext markup language (HTML) frames. In another embodiment, the two modules are Java applets that are run concurrently by client 22. In yet another embodiment, advisor module 108 and sales module 104 are independent applications that are executed in a multitasking operating system environment such as UNIX or Microsoft Windows. In one embodiment, manifestations of modules 104 and 108 are presented to the user display 40 in an asynchronous manner regardless of how the underlying modules are encoded and executed. That is, the user is free to either use or ignore advisor module 108. When the user ignores advisor module 108, sales module 104 is used to complete the transaction.

Figure 11:
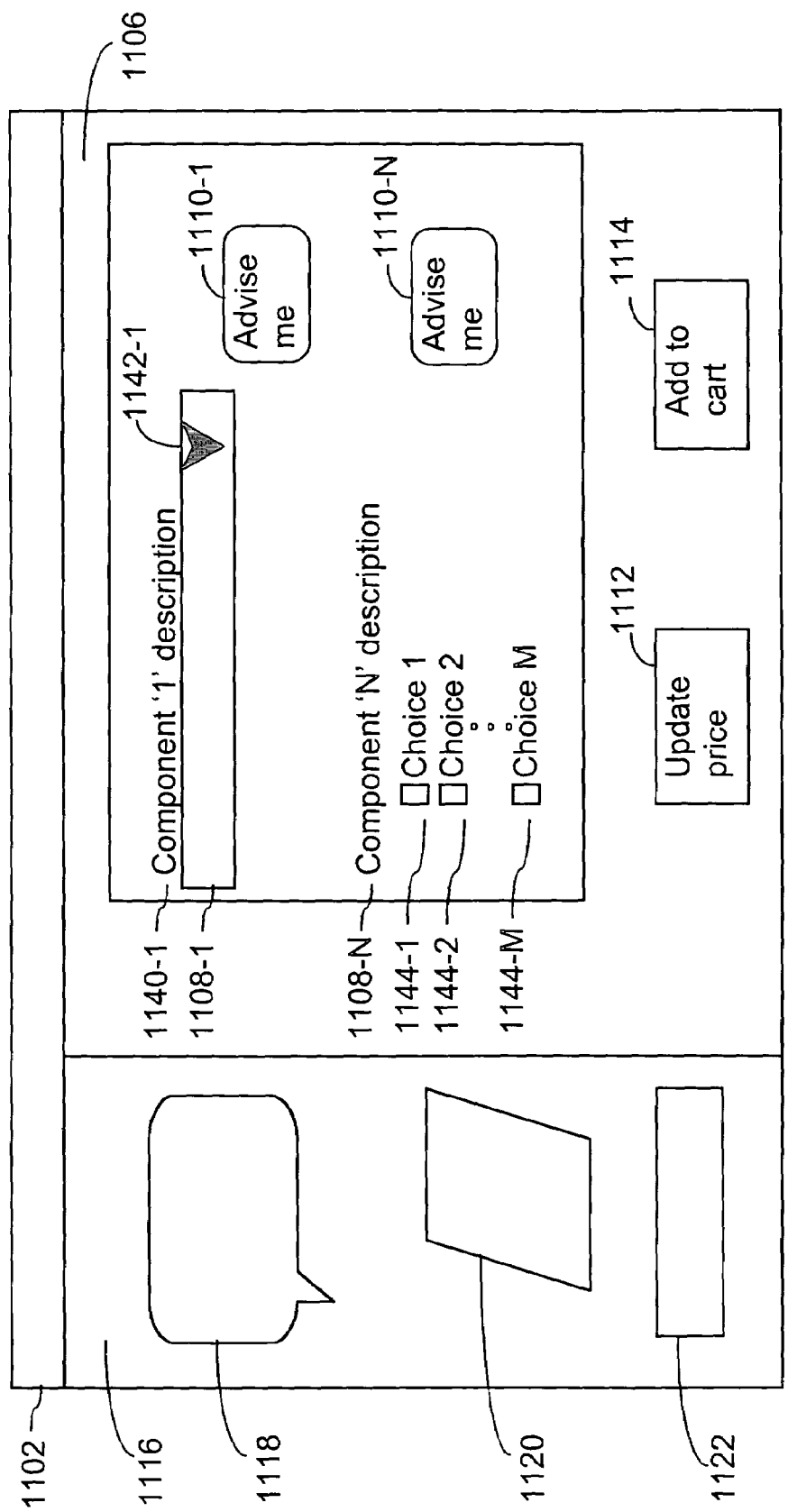
FIG. 11 is an exemplary graphical user interface, which includes an instance of a sales module and an advisor module, in accordance with the present invention.

FIG. 11 schematically illustrates the important features of the graphical appearance of manifestations of advisor module 108 and sales module 104 on user display 40 in one embodiment of the present invention. In this embodiment, the user interacts with sales module 104 through browser 54 which is in communication with an e-commerce site. The user has access to all of the standard browser 54 controls (1102) including forward and backward navigation. The manifestation of sales module 104 is generally contained in its own frame 1106 to allow the sales module content to scroll independently of the manifestation of advisor 108 (1116). For each component 1108, there is a brief description of the component 1140 and a mechanism to select an option. Exemplary mechanisms include drop down menus 1142, check boxes 1144, radio buttons, or fields to enter text and/or numerical values. The configuration is not considered completed when there is a conflict between one or more pairs of options selected. An exemplary conflict is a situation in which the user has picked, for example, a high quality computer monitor and a graphics card that does not support such a monitor. Sales module 104 further provides tools such as "update the current price" 1112 and "add to cart" 1114.

In the embodiment shown in FIG. 11, the manifestation of advisor module 108 communicates to the user using one or more animated characters 1120 and/or a speech bubble 1118. Speech bubble 1118 is used for presenting the formatted display discussed previously in, for example, FIGS. 6A thru 6C. The user is provided with the option of interacting with advisor module 108 via control bar 1122 in advisor module 108 and specialized buttons in sales manifestation frame 1006, such as the "advise me" buttons 1110.

When speech bubble 1118 is not large enough to provide the formatted display generated by advisor module 108 during various stages of the product optimization process, the speech bubble is expanded. In one aspect, the speech bubble is expanded to the full screen, to present, for example, an instructional sequence. In another aspect of the invention, the advisor module 108 augments speech bubble 1118 with a pop-up window. Further, character manifestation 1120 uses a gesture to direct the user's attention to the pop-up window. Control bar 1222 contains user control elements such as specialized icons that allow the user to directly interact with the advisor module, such as requesting different types of general assistance.

Alternate Embodiments

Although sales module 104 and advisor module 108 are depicted on the same server 24 in FIG. 1, in one embodiment of the present invention, sales module 104 and advisor module 108 are resident on different servers 24. In yet another embodiment, advisor module 108 and sales module 104 reside on Client 22 and no server 24 is used. In still another embodiment, browser 54 is a component of operating system 52. In another embodiment of the present invention, advisor module 108 is standalone and operates in a manner that is completely independent of sales module 104. Such an embodiment is advantageously used, for example, when the user is interested in general advice on how to optimize certain aspects of a product. In yet other embodiments, the methods of the present invention are practiced by assigning all user interaction responsibility to advisor module 108. In such embodiments, sales module 104 is completely hidden from the user. In still another embodiment, advisor module 108 is employed during the states of information gathering and selection of a base product.

The present invention can be implemented as a computer program product that includes a computer program mechanism embedded in a computer readable storage medium. For instance, the computer program product could contain advisor module 108 and sales module 104 (FIG. 1). These program modules may be stored on a CD-ROM, magnetic disk storage product, or any other computer readable data or program storage product. The software module in the computer program product may also be distributed electronically, via the Internet or otherwise, by transmission of a computer data signal (in which the software modules are embedded) on a carrier wave.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in an order to best explain the principles of the invention and its practical applications, to thereby enable others skilled in the art to best utilize the invention and various modifications as are suited to the particular use contemplated. It is intended that the scope of the invention be defined by the following claims and their equivalents.

We claim:

1. A method of optimizing a product said product including a base product, the method comprising the steps of:
   (a) obtaining an identification of a user and a preliminary designation of said product; said identification identifying a user profile that is uniquely associated with said user, the user profile being persistent across multiple optimization sessions and comprising a plurality of characteristics of said user, said plurality of characteristics comprising:
  (1) a preferred social interaction type;
  (2) a plurality of domain familiarity indications, each of said domain familiarity indications reflecting said user's knowledge about a specific product domain; and
  (3) a price sensitivity for said user;
(b) providing a formatted display that includes a set of content related to said product and a format, the set of content determined at least in part by a characteristic selected from the group consisting of:
  (1) the preferred social interaction type;
  (2) the plurality of domain familiarity indications; and
  (3) the price sensitivity for said user;
(c) updating, based on a response by the user;
  (1) the plurality of characteristics to create an updated user profile, wherein updating the plurality of characteristics comprises updating at least one characteristic selected from the group consisting of:
    i) the preferred social interaction type;
    ii) the plurality of domain familiarity indications; and
    iii) the price sensitivity for said user;
  (2) a component associated with said base product when said response includes a selection of an option from a different set of options associated with said component;
(d) storing said updated user profile to determine the set of content of the formatted display for a future presentation made to said user, wherein the set of content of the formatted display for the future presentation is determined at least in part by a characteristic selected from the group consisting of:
  (1) the preferred social interaction type;
  (2) the plurality of domain familiarity indications; and
  (3) the price sensitivity for said user; and
(e) repeating steps (b) through (d) across one or more computer sessions at least once to optimize said product.

2. The method of claim 1, wherein said product further includes a plurality of components associated with said base product, each component in said plurality of components corresponding to, and selected by said user from, a different set of options, using said formatted display.

3. The method of claim 2, wherein a default option is designated for each component in said plurality of components.

4. The method of claim 2, wherein said formatted display comprises a menu including one or more elements selected from the group consisting of an option selected from said different set of options associated with said component, a frequently asked question associated with said component, an instructional sequence prompt, and a recommendation message.

5. The method of claim 1, further comprising presenting in the formatted display one or more suggested components based on the user profile.

6. The method of claim 1, wherein the formatted display provides a portion of a set of options corresponding to said component associated with said base product.

7. The method of claim 1, wherein said response to said formatted display of step (b) includes a designation of an option for said component associated with said base product and step (c) further comprises the step of updating at least one characteristic in said user profile associated with said component.

8. The method of claim 1, wherein said product is optimized when said user indicates that said product is optimized.

9. The method of claim 1, wherein said set of content for said formatted display is further determined based on a suitability factor of said component in said product and for an intended use for the product and wherein the component is emphasized when said suitability factor exceeds a threshold value; and wherein said suitability factor is a value retrieved from a database, and wherein the intended use for the product is a characteristic stored in the user profile.

10. The method of claim 9, further comprising the steps of:
determining a change to said component that maximizes said suitability factor of said component in said product for the user's intended use for said product;
presenting said change in response to a user generated event; and
implementing said change to said product when a confirming response is received.

11. The method of claim 9, wherein said product further includes a plurality of components associated with said base product, each component in said plurality of components associated with, and selected from, a different set of options; and
the different set of options associated with each component from said set of components is provided if said suitability factor for said component for the intended use of the product exceeds the threshold value.

12. The method of claim 1, wherein a timer is used to monitor the period of time between the presentation of said formatted display and the response to the formatted display by the user and, when said user does not respond to said formatted display within a period of time, said failure to respond is treated as a response comprising a signal that said user has chosen not to respond to said formatted display.

13. The method of claim 1, wherein options for said component are presented in said formatted display of step (b); wherein the selected component is dynamically selected from a plurality of components associated with said base product based on said user profile.

14. The method of claim 1, further comprising the steps of:
transmitting a set of questions;
receiving at least one answer to said set of questions; and
updating said characteristic in said user profile based on said at least one answer.

15. The method of claim 1, wherein a characteristic in said user profile associated with said user is modified based on a user event associated with said user occurring during an optimization of a different product.

16. The method of claim 1, wherein a characteristic in said user profile associated with said user is modified based on a user event associated with said user occurring during an optimization of said product during a different session.

17. A computer readable memory to direct a computer to optimize a product, said product including a base product, comprising:
a user profile database stored in said memory; each profile in said user profile database being uniquely associated with a different user, persisting across multiple optimization sessions, and comprising a plurality of characteristics, said plurality of characteristics comprising:
(a) a preferred social interaction type;
(b) a plurality of domain familiarity indications, each of said domain familiarity indications reflecting said user's knowledge about a specific product domain; and
(c) a price sensitivity; and
an advisor module for helping a user optimize said product;

said advisor module including executable instructions, said executable instructions including:
(a) instructions for obtaining an identification of said user and a preliminary designation of said product; said identification identifying a user profile associated with said user in said user profile database; wherein said instructions for obtaining an identification further include instructions for creating said user profile when it does not exist in said user profile database;
(b) instructions for providing a formatted display that includes a set of content related to said product, the set of content determined at least in part by a function of at least one characteristic from said user profile, said at least one characteristic selected from the group consisting of:
(1) a preferred social interaction type for the user;
(2) a plurality of domain familiarity indications for the user;
(3) a price sensitivity for the user;
(c) instructions for updating, based on a response by said user:
(1) said user profile to create an updated user profile, wherein updating said user profile comprises updating at least one characteristic selected from the group consisting of:
i) the preferred social interaction type;
ii) the plurality of domain familiarity indications; and
iii) the price sensitivity; and
(2) a component associated with said base product when said response includes a selection of an option from a different set of options associated with said component; and
(d) storing said updated user profile to determine the set of content of the formatted display for a future presentation made to said user, wherein the set of content of the formatted display for the future presentation is determined at least in part by a characteristic selected from the group consisting of:
(1) the preferred social interaction type;
(2) the plurality of domain familiarity indications; and
(3) the price sensitivity for said user; and
(e) repeating steps (b) through (d) across one or more computer sessions at least once to optimize said product.

18. The computer readable memory of claim 17, wherein said product further includes a plurality of components associated with said base product, each component in said plurality of components corresponding to, and selected by said user from, a different set of options.

19. The computer readable memory of claim 18, wherein a default option is designated for each component in said plurality of components.

20. The computer readable memory of claim 17, wherein the formatted display provides a portion of a set of options corresponding to a component associated with said base product.

21. The computer readable memory of claim 17, wherein said response to said formatted display of step (b) includes a designation of an option for a component associated with said base product and step (c) further includes instructions for updating said component in said user profile.

22. The computer readable memory of claim 17, wherein said product is optimized when said user indicates that said product is optimized.

23. The computer readable memory of claim 17, wherein said set of content for said formatted display is further determined based on a suitability factor of said component in said product for the user's intended use for said product a characteristic in said user and wherein the component is emphasized when said suitability factor exceeds a threshold value.

24. The computer readable memory of claim 17, wherein a timer is used to monitor the period of time between the presentation of said formatted display and the response to the formatted display by the user and when said user does not respond to said formatted display within a period of time, a signal that said user has not chosen to respond to said formatted display is sent to the instructions for receiving a response.

25. The computer readable memory of claim 17, wherein instructions for obtaining an identification of a user and a preliminary designation of said product further includes:
instructions for querying said user profile database and identifying said user profile from a response to said query; wherein, when a response to said query fails to identify said profile, said instructions to obtain a user profile further include:
instructions for initiating a new user profile and associating said new user profile with said user; and
instructions for storing said new user profile in said user profile database.

26. The computer readable memory of claim 17, further comprising:
a knowledge database stored in said memory; said knowledge database including a description of said base product and a description of at least one option in at least one set of options corresponding to a component associated with said base product; wherein:
said instructions for providing a formatted display, which includes the set of options corresponding to a component selected from said plurality of components associated with said base product, further includes:
instructions for accessing a description of an option in said different set of options associated with said component from said knowledge database; wherein said function comprises a comparison of said description with said characteristic in said user profile.

27. The computer readable memory of claim 17, further comprising:
a sales module; said sales module including executable instructions, said executable instructions including:
(a) instructions for providing a product selection choice; each said product in said product selection choice including a base product and at least one default component;
(b) instructions for receiving an election; said election designating a product in said product selection choice;
(c) instructions for determining when to call an instance of said advisor module; and
(d) instructions for calling an instance of said advisor module.

28. The computer readable memory of claim 27, wherein said instructions for calling an instance of said advisor module further includes instructions for generating said event record and for passing said event record to said advisor module when said instance of said advisor module is called by said sales module.

29. The computer readable memory of claim 27, the computer readable memory further comprising a sales database for storing pricing information associated with said product; the sales module further including:
instructions for querying said sales database for pricing information corresponding to said product selection; and
instructions for transmitting said pricing information.

30. The computer readable memory of claim 27, wherein said sales module further includes:

instructions for providing a user selectable event;

instructions for receiving an indication that said user selectable event has been selected by said user; said sales module further including instructions for notifying said advisor module when a signal indicating that said user selectable event has been selected is received.

31. The computer readable memory of claim 27, wherein said sales module further comprises instructions for terminating an instance of said advisor module when a second election is received by said instructions for receiving an election described in claim 27 paragraph b; said second election including an indication that said user wishes to terminate said instance of said advisor module.

32. The computer readable memory of claim 17, wherein said profile in said user profile database includes a user identifier and at least one entry selected from the group consisting of a domain familiarity indicator, an advisor interaction database, a product preference database, a product selection database, and a user characteristic.

33. The computer readable memory of claim 17, wherein said formatted display comprises a menu including one or more elements selected from the group consisting of an option associated with a component, associated with said base product a frequently asked question associated with said component, an instructional sequence prompt, and a recommendation message.

34. The computer readable memory of claim 17, wherein a manifestation of said advisor module includes at least one feature selected from the group consisting of an on-screen character, an audible voice, text, a multimedia prop, and a sound effect.

35. The computer readable memory of claim 17, wherein said advisor module further comprises:

instructions for storing a record of said product optimization; and instructions for resuming a product optimization based on a stored record of a prior product optimization.

36. A method of optimizing a product, said product including a base product, the method comprising the steps of:
(a) obtaining an identification of a user and a preliminary designation of said product; said identification identifying a user profile which is persistent across multiple optimization sessions and that is uniquely associated with said user, the user profile comprising data used to model said user, said data used to model said user comprising:
 (1) a first set of data, said first set of data having been collected through explicit user selections; and
 (2) a second set of data, said second set of data having been inferred from user actions;
(b) providing a formatted display that includes a set of content related to said product and a format, the set of content determined at least in part by said second set of data used to model said user and inferred from user actions;
(c) updating, based on a response by the user:
 (1) said data used to model said user to create an updated user profile; and
 (2) a component associated with said base product when said response includes a selection of an option from a different set of options associated with said component;
(d) storing said updated user profile to determine the set of content of the formatted display for a future presentation made to said user;
(e) repeating steps (b) through (d) across one or more computer sessions at least once to optimize said product; and
(f) providing automated assistance at the request of said user; and
(g) presenting in the formatted display one or more suggested components based on the user profile.

37. The method of claim 36, wherein the data used to model said user comprises an indicator that indicates the number of times that the user requested automated assistance.

38. The method of claim a 36, wherein the data used to model said user comprises an indication of the user's price sensitivity.

39. The method of claim 36, wherein providing the formatted display comprises providing a recommendation to the user, wherein the first set of data and the second set of data comprise a plurality of characteristics, wherein each characteristic from the plurality of characteristics has a weight, and wherein updating the data used to model the user comprises, for at least one characteristic from the plurality of characteristics:
(a) increasing the weight for that characteristic if the recommendation is accepted; or
(b) decreasing the weight for that characteristic if the recommendation is rejected.

* * * * *

UNITED STATES PATENT AND TRADEMARK OFFICE
CERTIFICATE OF CORRECTION

PATENT NO. : 7,505,921 B1 Page 1 of 1
APPLICATION NO. : 09/518916
DATED : March 17, 2009
INVENTOR(S) : Lukas et al.

It is certified that error appears in the above-identified patent and that said Letters Patent is hereby corrected as shown below:

Column 30, Claim 9, line 5, after "in said product", please delete "and".

Column 31, Claim 23, line 67, after "for said product", please delete "a charac-".

Column 32, Claim 23, line 1, before "and wherein the component", please delete "teristic in said user".

Signed and Sealed this

Second Day of June, 2009

JOHN DOLL
*Acting Director of the United States Patent and Trademark Office*